United States Patent [19]
Matsumoto et al.

[11] Patent Number: 6,155,363
[45] Date of Patent: Dec. 5, 2000

[54] CRAWLER BELT VEHICLE

[75] Inventors: Naoki Matsumoto; Yasutomo Abe; Kenjiro Hiratsuna; Masahiro Akiyama; Tsuyoshi Yoshigasaki; Hajime Yoshimura; Toshiyuki Kitazawa, all of Wako, Japan

[73] Assignee: Honda Giken Kogyo Kabushiki Kaisha, Japan

[21] Appl. No.: 09/354,472

[22] Filed: Jul. 15, 1999

Related U.S. Application Data

[62] Division of application No. 08/893,831, Jul. 11, 1997, Pat. No. 5,975,226.

[30] Foreign Application Priority Data

| Jul. 30, 1996 | [JP] | Japan | 8-200790 |
| Jul. 30, 1996 | [JP] | Japan | 8-200791 |
| Jul. 30, 1996 | [JP] | Japan | 8-200793 |
| Jul. 30, 1996 | [JP] | Japan | 8-200795 |
| Jul. 30, 1996 | [JP] | Japan | 8-200796 |
| Jul. 30, 1996 | [JP] | Japan | 8-200798 |
| Jul. 30, 1996 | [JP] | Japan | 8-200801 |

[51] Int. Cl.$^7$ .................................. B62D 55/108
[52] U.S. Cl. ................. 180/9.34; 180/9.1; 180/9.58; 180/180
[58] Field of Search ................. 180/9.34, 9.36, 180/9.1, 9.21, 9.28, 9.3, 9.5, 9.54, 190, 193, 185, 195, 9.58; 305/127, 168, 181

[56] References Cited

U.S. PATENT DOCUMENTS

| 2,786,725 | 3/1957 | Thorne | 305/181 |
| 3,058,242 | 10/1962 | Ocnaschek | 180/9.1 |
| 3,387,896 | 6/1968 | Sobota | |
| 3,613,811 | 10/1971 | Brandli | 180/193 |
| 3,658,392 | 4/1972 | Perreault et al. | 305/127 |
| 3,690,741 | 9/1972 | Pierson | 305/38 |
| 3,711,164 | 1/1973 | Chaumont | 305/24 |
| 3,724,580 | 4/1973 | Adams, Jr. | 180/9.2 R |
| 3,756,667 | 9/1973 | Bombardier et al. | 305/24 |
| 3,770,330 | 11/1973 | Bombardier | 305/127 |
| 3,799,627 | 3/1974 | Zwieg | 305/38 |
| 3,893,526 | 7/1975 | Esch | 180/5 R |
| 3,933,214 | 1/1976 | Guibord et al. | 180/9.1 |
| 4,194,583 | 3/1980 | Aaen | 180/190 |
| 4,217,006 | 8/1980 | Dehnert | 305/168 |
| 4,279,449 | 7/1981 | Martin et al. | 305/35 EB |
| 4,635,740 | 1/1987 | Krueger et al. | 180/9.21 |
| 5,174,638 | 12/1992 | Tokue et al. | 305/166 |
| 5,261,853 | 11/1993 | Suto | 180/9.1 |
| 5,571,275 | 11/1996 | Cyr | 305/127 |
| 5,575,347 | 11/1996 | Uchibaba et al. | 180/9.34 |
| 5,713,645 | 2/1998 | Thompson et al. | 305/168 |
| 5,975,226 | 11/1999 | Matsumoto et al. | 180/9.34 |

*Primary Examiner*—J. J. Swann
*Assistant Examiner*—Michael Cuff
*Attorney, Agent, or Firm*—Adams & Wilks

[57] ABSTRACT

A crawler belt vehicle comprises a chassis, a pair of first wheels mounted on the chassis, a pair of second wheels mounted on the chassis, a pair of crawler belts each trained around the first pair of wheels and the second pair of wheels, and a pair of equalizers each for pressing one of the crawler belts against a ground. Each of the crawler belts has low-friction members spaced-apart from each other in a longitudinal direction of the crawler belt. Each of the equalizers has a leaf spring having a first end connected to the chassis and a second end opposite the first end, and a slider supported on the second end of the leaf spring for undergoing pivotal movement about an axis extending in the longitudinal direction of the crawler belt for pressing the crawler belt against the ground by the resiliency of the leaf spring.

19 Claims, 20 Drawing Sheets

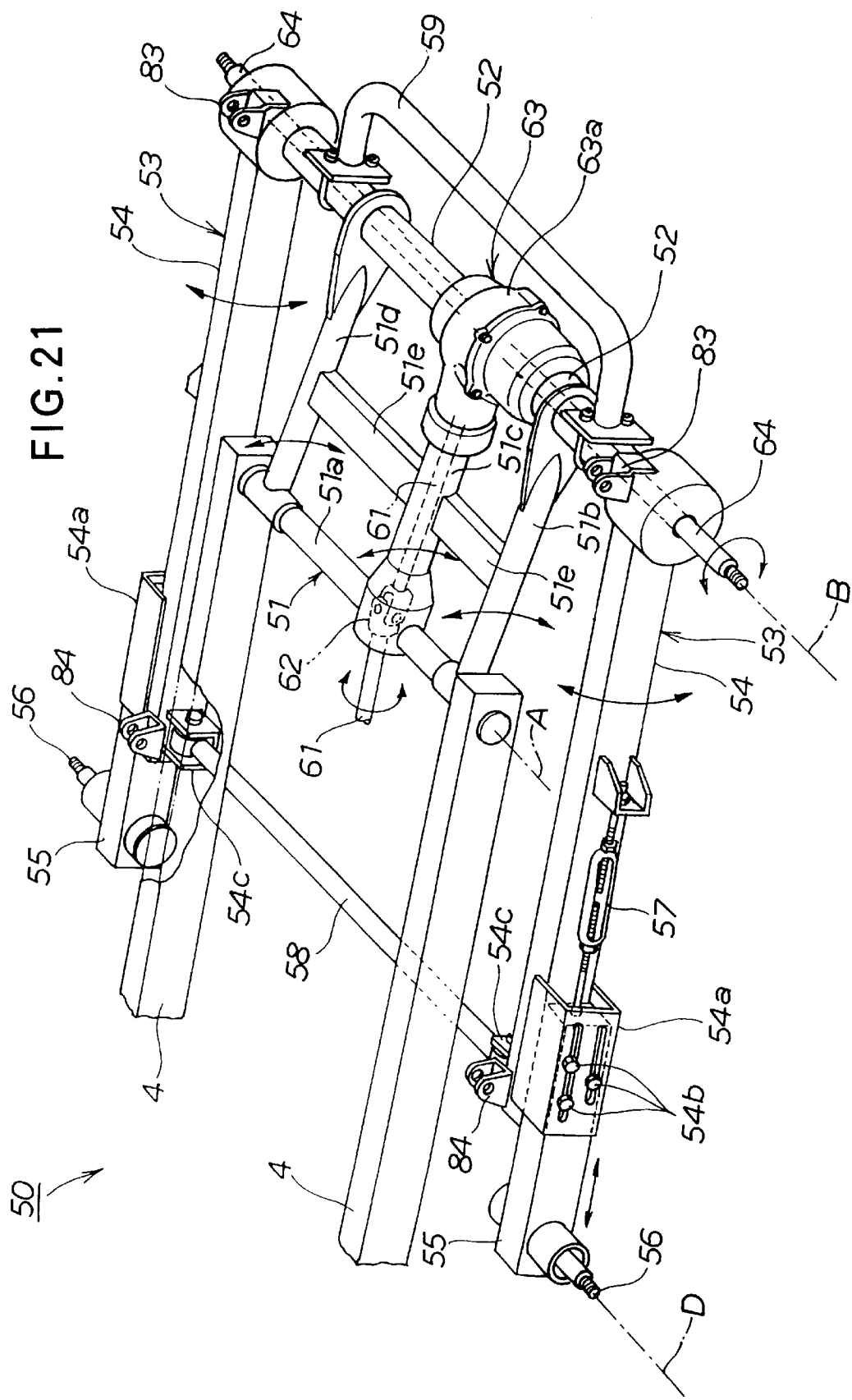

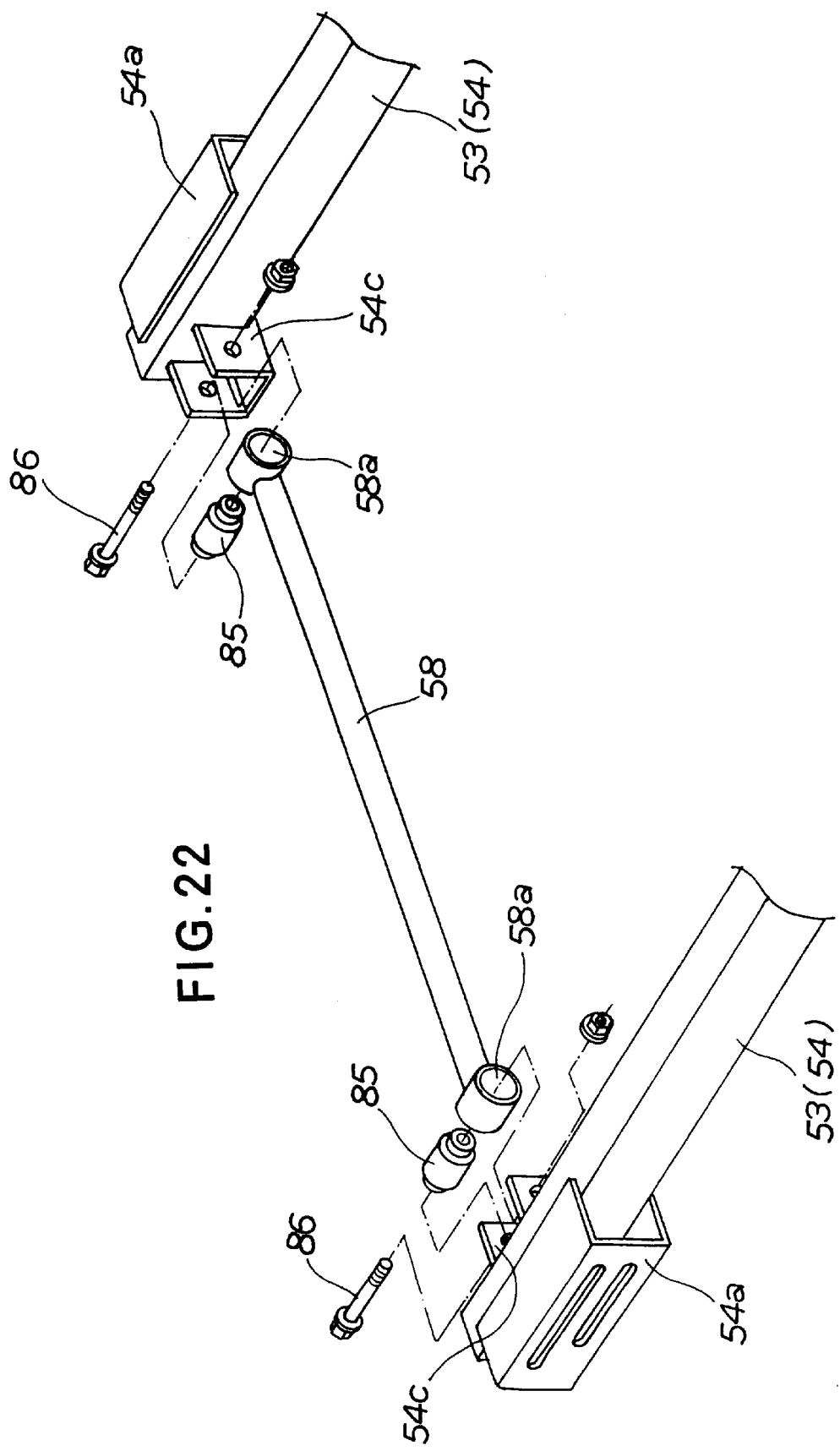

CRAWLER BELT VEHICLE

RELATED APPLICATION

This application is a division of application Ser. No. 08/893,831 filed Jul. 11, 1997, (now U.S. Pat. No. 5,975,226.

BACKGROUND OF THE INVENTION

1. Field of the Invention

The present invention relates generally to crawler-belt type vehicles, and more particularly to an improvement in "half-crawler vehicles" which include front wheels with pneumatic tires and rear crawlers.

2. Description of the Related Art

The so-called half-crawler vehicles are known from, for example, Japanese Patent Laid-open Publication No. 60-143189 disclosing an "off-road vehicle" and Japanese Patent Laid-open Publication No. 59-164270 disclosing a "four-wheel drive vehicle".

The off-road vehicle disclosed in the above-mentioned 60-143189 publication comprises a pair of left and right balloon-tired front wheels attached to the front portion of the vehicle's base frame structure or chassis, a pair of left and right rear balloon-tired wheels attached to the rear portion of the chassis, a pair of left and right idler wheels (intermediate wheels), and a pair of left and right rubber-made crawler belts each passing around and operatively connecting the associated rear wheel and idler wheel.

The four-wheel drive vehicle disclosed in the above-mentioned 59-164270 publication comprises a pair of left and right front wheels attached to the front portion of the chassis, a pair of left and right rear balloon-tired wheels attached to the rear portion of the chassis, a pair of left and right idler wheels, and a pair of left and right rubber-made crawler belts each passing around and operatively connecting the associated rear wheel and idler wheel. This four-wheel drive vehicle also includes a pair of left and right lower tired rollers (functioning as equalizers) each provided between the associated rear wheel and idler wheel. Each of the lower rollers is attached to the chassis via a support bracket and abuts against the inner surface of the associated crawler belt to press the belt against the road surface or ground.

Generally, with these half-crawler vehicles as disclosed in the 60-143189 and 59-164270 publications, high controllability is required on soft grounds such as a snow-covered road or ground, and high running performance is desired even on a fresh- snow-covered untrod ground.

In order to meet these requirements, it is necessary to appropriately examine and set the ground pressure with which the front wheel tires and crawler belts contact the ground. When the ground pressure of the front wheel tires is relatively low, these tires sink into a snow-covered or muddy ground with a small sinking depth, which would lead to each front wheel tire sinking into the soft ground over a relatively small area thereof as viewed sideways (projected area of sunk front-wheel portions). This, in turn, provides a small steering resistance, so that there can not be produced a necessary frictional force for properly steering of the front wheel tires. Too small steering resistance would make it difficult to provide sufficient controllability over the vehicle on a soft ground.

When the ground pressure of the front wheel tires is relatively high, these tires sink into a snow-covered or muddy ground with a great sinking depth and are subjected to increased resistance of the snow or mud, which would lower the sharp-turning capability of the vehicle. This is often a serious problem particularly on a fresh-snow-covered untrod ground.

Similarly, when the ground pressure of the crawler belts is relatively low, these belts sink into a snow-covered or muddy ground with a small sinking depth, while when the ground pressure of the crawler belts is high, these belts sink into a snow-covered or muddy ground with a great sinking depth. Too great sinking depth of the crawler belts would lead to a great running resistance and hence lower running performance of the vehicle. This is often a serious problem particularly on a fresh-snow-covered untrod ground.

Further, in the off-road vehicle disclosed in the 60-143189 publication, intermediate wheels functioning as driving wheels are disposed between the front wheels and the idler wheels, and a vehicle engine is provided between the front wheels and the intermediate wheels.

Generally, the half-crawler vehicles, running on snow-covered or muddy soft grounds, require a large driving force of their crawlers and hence are equipped with a large-sized and heavyweight engine. Thus, in each of such half-crawler vehicles, the mounted position of the heavyweight engine would have a great effect on the wheel load (part of the vehicle's weight acting on the wheels).

Furthermore, because the vehicle's running performance on the snow-covered ground depends on the ground pressure of the front wheels and crawler belts as noted earlier, the wheel load would have a significant effect as a factor determining the ground pressure. Namely, it is absolutely necessary to minimize the overall weight of the vehicle, in order to allow the vehicle to appropriately run on a snow-covered, muddy or other sort of soft ground.

As another example of the half-crawler vehicle, a "tire-driven crawler belt" is disclosed in Japanese Utility Model Publication No. HEI-8-8891. On the inner surface of each of the vehicle's crawler belts, there is formed a pattern of raised and recessed portions for contact with the treads of the tires. The pattern of raised and recessed portions forms a multiplicity of oblique channels as escapeways for muddy water. Namely, water and mud drawn between the tire treads and the inner surface of the crawler belts are forced out or discharged along the oblique channels by the channels narrowing in width as the crawler belts bend along the curved surface of the tires and also by the pattern of raised and recessed portions being compressed by the tires. The disclosed half-crawler vehicle permits an efficient escape of muddy water and such, in a situation where the crawler belts do not sink deep into the soft ground.

However, the crawler belts, running on a snow-covered, muddy or other sort of soft ground, often sink deep into the soft ground. In such a case, snow or mud drawn between the tire treads and the crawler belts can not be let out efficiently. Reduced efficiency in letting out the snow or mud would reduce frictional resistance between the tires and crawler belts, which in turn would result in reduced efficiency in driving force transmission from the tires to the crawler belts.

In particular, on a fresh-snow-covered untrod ground, the tires and crawler belts of the half-crawler vehicle sink deep into the soft ground, so that a great amount of snow may be drawn into the inner surface area of the crawler belts. If the snow is drawn into and compressed between the tires and the crawler belts, it may easily turn into ice, which would significantly reduce the frictional resistance between the tires and the crawler belts. Further, the tires and crawler belts, sunk deep into the fresh-snow-covered untrod ground, would present increased running resistance, so that the vehicle requires a greater driving force. The reduced frictional resistance between the tires and the crawler belts would have a significant adverse effect on the running performance of the half-crawler vehicle.

Furthermore, in the above-mentioned crawler belt vehicle disclosed in Japanese Patent Laid-open Publication No. 59-164270, each of the lower rollers presses the associated crawler belt in a point-to-point contact, and hence the ground contact area of the crawler belt is quite small. In order to increase the ground contact area of each of the crawler belts to thereby attain an increased ground adhesion force ("grip"), it is necessary to provide a relatively large number of the lower rollers in the longitudinal direction of the crawler belt, which would however increase the structural complexity of the vehicle.

As one possible approach to increase the ground adhesion force with a relatively simple construction, there has been proposed a crawler as shown in FIG. 25. In this proposed crawler 100, a rubber-made crawler belt 103 passes around and operatively connects two vehicle wheels 101 and 102, and the crawler belt 103 is pressed against a ground via a slider 104 (equivalent to the equalizer) of predetermined length normally urged downward by a spring 105. By the crawler belt 103 being pressed against the ground via the slider 104 of predetermined length, the ground contact area and adhesion force can be increased to a considerable degree.

However, the proposed crawler 100 presents the problem that frictional resistance between the crawler belt 103 and slider 104 undesirably increases because they are constantly in sliding contact with each other. Increase in the frictional resistance between the crawler belt 103 and slider 104 leads to increased resistance to the movement of the crawler belt 103, which would shorten the life of the crawler belt 103 due to the resulting frictional heat. The frictional resistance between the crawler belt 103 and slider 104 can be lowered by only reducing the urging or pressing force of the spring 104, but such reduced pressing force of the spring 104 can not achieve a sufficient ground contact force of the crawler belt 103.

An improved crawler belt addressing the foregoing problems is disclosed in, for example, Japanese Utility Model Publication No. 52-28258. This improved crawler belt has a plurality of side guide protrusions formed thereon along the opposite longitudinal edge portions and spaced apart from each other in the longitudinal direction of the belt. U-shaped reinforcing metal pieces are embedded in the individual side guide protrusions as well as in flat belt portions between the protrusions. The side guide protrusions function to prevent the tires from being accidentally detached from the crawler belt, and the reinforcing metal pieces function to increase the rigidity of the crawler belt against its lateral bending.

When the side guide protrusions are subjected to a force, applied from the tires, pressing the crawler belt in the laterally outward direction, a bending moment occurs at the base of the guide protrusions. Bending rigidity of the reinforcing metal pieces has a direct effect on that of the side guide protrusions. Therefore, in order to effectively avoid accidental detachment of the tires from the crawler belt, it is necessary to enhance the bending rigidity of the reinforcing metal pieces. The bending rigidity may be enhanced by increasing the thickness of the metal pieces, which would however result in an increased thickness (base gauge) of the crawler belt. The increased thickness would make the crawler belt difficult to bend, thus increasing the running resistance to the crawler vehicle.

Further, in the half crawler vehicle disclosed in Japanese Patent Laid-open Publication No. 59-164270, the chassis and wheels are connected with each other via a suspension including springs or dampers. When the half crawler vehicle is travelling along a slope, the chassis inclines laterally so that a portion of the body above the suspension is displaced toward the bottom of the slope. As a consequence, the vehicle would lose the weight balance and can not be operated appropriately.

In addition, the crawler belts of the half-crawler vehicles generally suffer from considerable resistance to a sideslip, and this sideslip resistance would act as a braking factor and reduce the vehicle's small-turning capability.

Further, according to the disclosure of the above-mentioned HEI-8-8891 publication, the half-crawler vehicle includes front wheels with pneumatic tires mounted on a front portion of the chassis, rear wheels with pneumatic tires mounted on a rear portion of the chassis, intermediate wheels with pneumatic tires disposed between the front and rear wheels, and half crawler belts each passing around and operatively connecting the associated front and rear wheels. This half-crawler vehicle is based on a front-and-rear-wheel (four-wheel) drive where the driving force from the vehicle engine is delivered to both the front wheels and the rear wheels.

The disclosed half-crawler vehicle is designed in such a manner that the crawler belts are attached to the intermediate and rear wheels only when the vehicle is to run on an off-road such as a soft ground; for normal smooth roads, the crawler belts can be removed or detached from the wheels so as to afford better running performance and riding comfort. However, the effective radial length of each of the rear and intermediate wheels, measured from the wheel's center to the ground, significantly varies depending on whether the crawler belt is attached thereto or not; namely, the effective radial length varies exactly by the thickness (base gauge) of the crawler belt—a greater thickness of the crawler belt yields a greater variation in the effective radial length.

Additionally, because the half-crawler vehicle disclosed in the HEI-8-8891 publication is based on the front-and-rear-wheel drive, it is necessary that the rotating speeds of the front and rear wheels be adjusted to accurately coincide with each other when the crawler belts are removed. In other words, if the rotating speeds of the front and rear wheels do not agree with each other, some effective measures must be made between the driving systems for the front and rear wheels to avoid inconveniences.

Also, the front wheel tires may be replaced with larger-diameter tires in order to enhance the running performance of the vehicle in accordance with the running surface conditions. In such a case as well, some effective measures must be made between the driving systems for the front and rear wheels.

SUMMARY OF THE INVENTION

The applicants of the present application studied in detail various characteristics of crawler belt vehicles that are required for enhanced controllability and running performance on a snow-covered, muddy or other sort of soft ground and has finally succeeded in setting the ground pressure of the front wheels and crawler belts to respective appropriate values to accomplish these goals.

A first aspect of the present invention provides a crawler belt vehicle which comprises: a pair of front wheels mounted on a front portion of a chassis and each provided with a pneumatic tire; a pair of rear wheels mounted on a rear portion of the chassis and each provided with a pneumatic tire; a pair of intermediate wheels mounted on the chassis between the front wheels and the rear wheels; and a pair of crawler belts each passing around the rear wheel and the intermediate wheel, wherein ground pressure of the tires of the front wheels is set within a range of 0.1–0.15 kgf/cm², and ground pressure of the crawler belts is set within a range of 0.04–0.05 kgf/cm². By thus setting the ground pressure of the front wheel tires and crawler belts to respective appropriate values, the controllability and running performance of the vehicle on a soft ground, particularly on a fresh-snow-covered ground, can be improved to a significant degree.

Here, "ground contact areas" determining the ground pressure of the front wheel tires and crawler belts are measured as follows by placing the crawler belt vehicle on a flat hard road surface:

(1) ground contact area of the front wheel tires=area over which the front wheel tires are in contact with the road surface (i.e., area of a portion of the tires flattened by the road surface); and (2) ground contact area of the crawler belts=area over which the crawler belts are in contact with the road surface (area of a portion of the belt in contact with the road surface)×(width of the belt)

A second aspect of the present invention provides a crawler belt vehicle which comprises: a pair of front wheels each provided with a pneumatic tire; a pair of rear wheels each provided with a pneumatic tire; a pair of intermediate wheels provided between the front wheels and the rear wheels; a pair of crawler belts each passing around the rear wheel and the intermediate wheel; and an engine positioned between the intermediate wheels and the rear wheels.

By thus positioning the engine between the front and rear ends of the crawler belts, i.e., between the rear and intermediate wheels to thereby place the vehicle's center of gravity nearer to the rear end thereof. This arrangement achieves appropriate loads on the front wheels. As a consequence, the driving mechanisms located between the engine and the crawler belts can be reduced in length and hence in weight, which could substantially reduce a total weight of the vehicle and enhance the vehicle's running performance on a soft ground.

Further, the engine is provided in such a manner that at least part of the engine is located within loops of the crawler belts as viewed sideways. By thus positioning part of the heavy engine below the upper portion of the crawler belts, the center of gravity of the vehicle is lowered, to thereby achieve a stable running condition of the vehicle.

A third aspect of the present invention provides a crawler belt vehicle which comprises: a pair of front wheels mounted on a front portion of a chassis and each provided with a pneumatic tire; a pair of rear wheels mounted on a rear portion of the chassis and each provided with a pneumatic tire; a pair of intermediate wheels mounted on the chassis between the front wheels and the rear wheels; and a pair of crawler belts each passing around the rear wheel and the intermediate wheel, driving force being delivered from the tires of the rear wheels to the crawler belts by frictional resistance between the tires and the crawler belts, wherein each of the crawler belts has a plurality of discharge openings for letting out foreign substances, including snow or mud, drawn into an inner surface area of the crawler belt.

The discharge openings are formed along opposite longitudinal edge portions of each of the crawler belts. Preferably, each of the crawler belts comprises left, central and right belt members disposed in parallel relation to each other and connected together at locations spaced apart from each other in a longitudinal direction of the crawler belt, so as to form a plurality of the discharge openings along the opposite longitudinal edge portions of the crawler belt.

With this arrangement, the snow or mud drawn into an area between the tires and crawler belt can be let out efficiently through the discharge openings, so that the efficiency in transmitting the driving force from the tires to the crawler belts can be maintained at a sufficient level without reducing the necessary frictional resistance between the tires and the crawler belts.

A fourth aspect of the present invention provides a crawler belt vehicle which comprises: a pair of crawler belts each passing around a pair of wheels mounted on a chassis; and a pair of equalizers each pressing one of the crawler belts against a ground, wherein each of the equalizers includes a slider of a predetermined length for pressing the crawler belt against the ground, and each of the crawler belts has a plurality of low- friction members projecting into sliding contact with the slider and spaced apart from each other in a longitudinal direction of the crawler belt. The friction members are lower in friction coefficient than the crawler belt, and each of the sliders is positioned at a distance from the crawler belt via the low- friction members.

The slider of each of the equalizers presses the crawler belt against a ground by means of the low-friction members. Because the slider is positioned at a distance from the inner surface of the crawler belt, no frictional resistance occurs therebetween. By thus reducing the frictional resistance between the equalizer and the crawler belt, the crawler can run with reduced running resistance and frictional heat. The reduced frictional heat prolongs the life of the crawler belt. Besides, by the crawler belt being pressed, via the slider of predetermined length, against the ground with an appropriate force, an increased grip or ground adhesion of the crawler belt is guaranteed.

Preferably, a portion of each of the low-friction members slidably contacting the slider has a circular shape so as to reduce its area of contact with the slider. Further, each of the low-friction members is made of a material, selected from among a group of low-friction resin, low-friction rubber, steel and aluminum, the material being lower in friction resistance coefficient than the crawler belt, and each of the sliders is made of low-friction resin lower in friction resistance coefficient than the crawler belt.

Examples of the low-friction resin include poly vinyl chloride (PVC) and polytetrafluoroethylene resin (Teflon: trademark). The low-friction rubber may be made by kneading together a rubber material similar to that of the crawler belt and polypropylene resin powder. Alternatively, the low-friction members may be made of the low-friction rubber lower in friction. resistance coefficient than the crawler belt, while the slider may be made of steel or aluminum.

A fifth aspect of the present invention provides a crawler belt passing around a plurality of pneumatic tires and made of a flexible material, which comprises: a plurality of side guide protrusions formed on an inner surface of the crawler belt along opposite longitudinal edge portions thereof and spaced apart from each other in a longitudinal direction of the crawler belt; and a plurality of reinforcing cross members embedded in the crawler belt in such a manner that at least one of the reinforcing cross members being disposed between every adjacent pair of the side guide protrusions.

With the reinforcing cross members each embedded in the belt between adjacent side guide protrusions, each of the guide protrusions is effectively protected by two adjacent reinforcing cross members spaced apart from each other in the longitudinal direction of the belt. Thus, the reinforcing cross members, functioning to increase the rigidity of the side guide protrusions, can be reduced in diameter, which makes it possible to substantially reduce the thickness (base gauge) of the crawler belt. As a consequence, the bending rigidity of the side guide protrusions can be enhanced without increasing the thickness of the crawler belt. The reduced thickness of the crawler belt would reduce the bending resistance of the crawler belt and thereby reduce the running resistance of the crawler belt vehicle.

Alternatively, at least one of the reinforcing cross members may be disposed at a bottom of each of the side guide protrusions and between every adjacent pair of the side guide protrusions. This arrangement even further increases the mechanical strength of the side guide protrusions, so that the reinforcing cross members can be further reduced in diameter, which makes it possible to further minimize the thickness (base gauge) of the crawler belt.

A sixth aspect of the present invention provides a crawler belt vehicle which comprises: a pair of front wheels mounted on a front portion of a chassis and each provided with a pneumatic tire; a pair of rear wheels and a pair of intermediate wheels mounted on a rear portion of the chassis via a rear suspension; a pair of crawler belts each passing around the rear wheel and the intermediate wheel; a vertically pivotable swing arm extending rearward from the chassis; a pair of rear-wheel driving shafts connected to a front end portion of the swing arm; a pair of subbeams connected to the front end portion of the swing arm for vertical pivotal movement and extending forward from the front end portion; a pair of intermediate-wheel axles connected to front ends of respective ones of the subbeams; the intermediate wheels mounted on respective ones of the intermediate-wheel axles; and the rear wheels mounted on distal end portions of the rear-wheel driving shafts as driving wheels. Relative to the chassis, the intermediate and rear wheels are movable vertically but immovable laterally.

The rear wheels are mounted in such a manner that they are movable relative to the chassis in the vertical direction but not in the lateral direction. Thus, the center of gravity of the chassis would not move relative to the rear wheels in the lateral direction of the vehicle. As a result, the weight balance of the chassis is maintained and the controllability of the vehicle is not influenced. Further, although during sharp-turning movement of the crawler belt vehicle, there may be produced force causing the crawler belts to slip sideways relative to the rear wheels, the half-crawler vehicle of the present invention can positively make use of the side slip of the crawler belts to thereby enhance its sharp-turning capability to a significant degree.

Further, because the two subbeams are vertically pivotably connected to the swing arm and the intermediate wheels are mounted on the intermediate-wheel axles fixed to the front end portions of the forward extensions of the subbeams, the two intermediate wheels can vertically move independently of each other. This allows the intermediate wheels to smoothly move up and down in accordance with ups and downs of a ground. Therefore, when the crawler belt vehicle is running on a ground with numerous ups and downs, the chassis is allowed to move up and down slowly due to the smooth, independent, vertical movement of the intermediate wheels. As a result, good ground followability and hence good riding conform are afforded by the invention.

Furthermore, when the crawler belts are driven via the rear wheels as driving wheels, the reactive force produces some moment in the crawler which would lift the intermediate wheels. Thus, the crawler can easily get over a pile of snow or mud lying ahead of the crawler, so that the running performance of the crawler belt vehicle can be significantly enhanced on the snow-covered or muddy ground.

Each of the subbeams is retractably expandable in a travelling direction of the crawler belt vehicle so as to adjust a tension of the crawler belt.

The subbeams are interconnected by means of a pivotable cross rod near predetermined locations thereof where the intermediate-wheel axles are mounted. As noted earlier, during sharp-turning movement of the crawler belt vehicle, there may be produced force causing the crawler belts to slip sideways relative to the rear wheels. Consequently, some moment is generated in the subbeams which would bend them laterally. By interconnecting the subbeams via a cross rod, the bending rigidity of the subbeams can be increased. Also, the subbeams are connected at their proximal ends to the swing arm and interconnected at their distal or front ends, so that the wheel alignment between the rear and intermediate wheels can be reliably maintained so as to improve straight drive stability and steering responsiveness.

A seventh aspect of the present invention provides a crawler belt vehicle which comprises: a pair of front wheels mounted on a front portion of a chassis and each provided with a pneumatic tire, the front wheels being driven via a vehicle engine; a pair of rear wheels mounted on a rear portion of the chassis and each provided with a pneumatic tire, the rear wheels being driven via the vehicle engine; a pair of intermediate wheels mounted on the chassis between the front wheels and the rear wheels and each provided with a pneumatic tire; and a pair of crawler belts each passing around the rear wheel and intermediate wheel, driving force being transmitted from the tires of the rear wheels to the crawler belts by frictional resistance between the tires of the rear wheels and intermediate wheels and the crawler belts; and a speed changing mechanism provided either between the engine and front-wheel driving shafts or between the engine and rear-wheel driving shafts. With this arrangement, the crawler belt vehicle is capable of smooth running irrespective of presence or absence of the crawler belts and a diameter of the front wheels.

In addition, because the speed changing mechanism is provided between the engine and the front-wheel driving shafts or between the engine and the rear-wheel driving shafts, the rotating speed of the front wheels and rear wheels can be changed promptly and easily. This permits smooth running of the crawler belt vehicle, irrespective of presence or absence of the crawler belts and the diameter of the front wheels.

BRIEF DESCRIPTION OF THE DRAWINGS

For better understanding of the present invention, various preferred embodiments will be described hereinbelow with reference to the accompanying drawings, in which:

FIG. 21 is a perspective view showing details of a rear suspension of the vehicle;

FIG. 22 is an exploded perspective view showing how a cross rod is attached to interconnect left and right subbeams in the rear suspension;

DETAILED DESCRIPTION OF THE PREFERRED EMBODIMENTS

Figure 1:
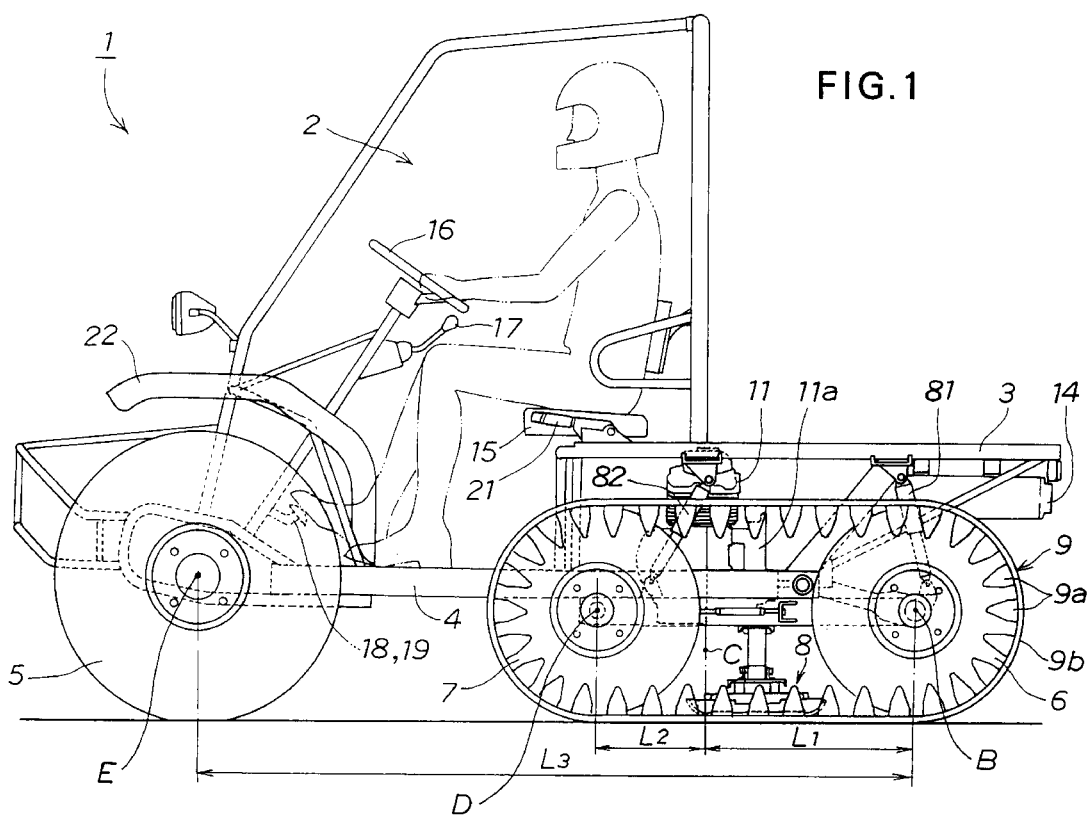
FIG. 1 is a side view of a crawler belt vehicle in accordance with an embodiment of the present invention.

FIG. 1 shows a crawler belt vehicle 1 in accordance with a preferred embodiment of the present invention, which is a so-called half-crawler vehicle including left and right front wheels with pneumatic tires and left and right rear crawlers.

Figure 2:
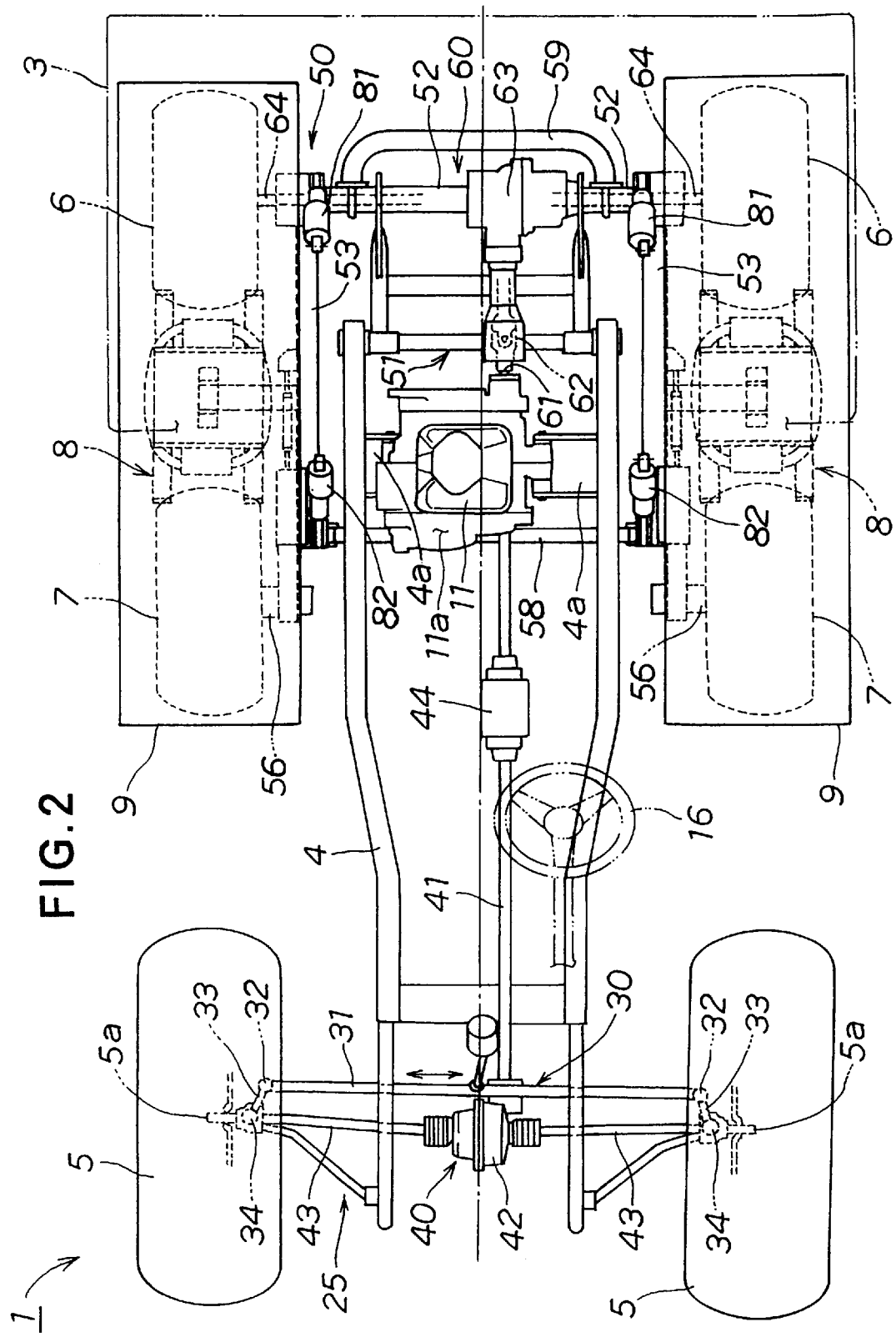
FIG. 2 is a plan view of the crawler belt vehicle of FIG. 1 with its cabin and luggage carrier omitted for clarity of illustration.

As shown more specifically in FIGS. 1 and 2, the crawler belt vehicle 1, which is a four-wheel drive vehicle, comprises a chassis 4 having a front cabin 2 and a rear luggage carrier 3 both fixedly mounted thereon, a pair of left and right driving front wheels 5, a pair of left and right driving rear wheels 6, a pair of left and right idler intermediate wheels 7 each disposed between the front and rear wheels 5 and 6, a pair of left and right equalizers 8 each disposed between the rear and intermediate wheel 6 and 7, and a pair of left and right crawler belts 9 each passing around and operatively connecting the associated rear and intermediate wheel 6 and 7.

Each of the front, rear and intermediate wheels 5, 6 and 7 is fitted with a rubber-made pneumatic balloon tire. The front wheels 5 are greater in diameter than the rear and intermediate wheels 6 and 7. On the rear portion of the chassis 4, a vehicle engine 11 with a transmission 11a is mounted by means of a pair of brackets 4a.

For the crawler belt vehicle 1 according to the present embodiment, the ground pressure of the front wheel tires is set within a range of 0.1–0.15 kgf/cm$^2$ and the ground pressure of the crawler belts 9 is set within a range of 0.04–0.05 kgf/cm$^2$.

If the ground pressure of the front wheel tires 5 in the crawler belt vehicle 1 running on a snow-covered, muddy or other sort of soft ground is lower than 0.1 kgf/cm$^2$, these tires 5 sink into the soft ground with a too small sinking depth, which would lead to the front wheel tires sinking into the soft ground over a relatively small projected area. This results in a too small steering resistance, making it difficult to provide sufficient controllability of the crawler belt vehicle on the soft ground.

If the ground pressure of the front wheel tires 5 is higher than 0.15 kgf/cm$^2$, these tires 5 sink into the soft ground with a too great sinking depth and hence are subjected to increased resistance of the snow or mud, which would reduce the sharp-turning capability of the vehicle. This is often a serious problem particularly on a fresh-snow-covered untrod ground.

Similarly, if the ground pressure of the crawler belts 9 is lower than 0.04 kgf/cm$^2$, these belts 9 sink into the soft ground with a too small sinking depth, while if the ground pressure of the crawler belts 9 is high, these belts 9 sink into the soft ground with a too great sinking depth. With a too small sinking depth of the crawler belts 9, a predetermined frictional force necessary for smooth running of the crawler belt vehicle 1 would not be provided so that the vehicle 1 can never run in a good condition. With a too great sinking depth of the crawler belts 9, running resistance from the ground would become excessive so that the vehicle can not run in a good condition. These are often serious problems particularly on a fresh-snow-covered untrod ground.

Therefore, it is preferable to set the ground pressure of the front wheel tires 5 and crawler belts 9 within the above-mentioned respective ranges. To this end, the entire engine 11 with the transmission 11a is provided between the front and rear ends of the crawler belts 9 in the present embodiment.

Specifically, it is preferable that the engine 11 be located between the respective centers of the rear and intermediate wheels 6 and 7. Most preferably, the engine 11 is provided at such a location that the ratio of a first distance L1 between the center C of the engine crank shaft and the center of the rear wheels 6, to a second distance L2 between the center C of the engine crank shaft and the center of the intermediate wheels 7 is 2:1. Further, the first distance L1 is about 30% of a third distance (wheelbase) L3 between the center lines of the front and rear wheels 5 and 6.

As further seen from FIG. 1, the engine 11 with the transmission 11a is provided in such a manner that part of the engine 11 is located within the loops of the crawler belts 9 as viewed sideways. By thus locating part of the heavy engine 11 below the upper portion of the crawler belt 9, the center of gravity of the vehicle is considerably lowered, to thereby achieve a stable running condition of the crawler belt vehicle 1.

The luggage carrier 3 is fixed to the rear portion of the chassis 4. Reference numeral 14 represents a muffler, 15 represents a seat for a vehicle driver or crew, 16 a steering wheel, 17 a change-gear lever, 18 an accelerator pedal, 19 a brake pedal, 21 a side brake, and 22 a front fender.

FIG. 2 is a plan view of the crawler belt vehicle 1 of FIG. 1 with its cabin 2 omitted for clarity of illustration—the luggage carrier 3 is shown in imaginary line—.

A front suspension 25, steering unit 30 and front wheel driving unit 40 are mounted on a front portion of the chassis 4, and a rear suspension 50 and rear wheel driving unit 60 are mounted on a rear portion of the chassis 4.

The steering unit 30 includes a tie rod 31 for delivering a steering force from the steering wheel 16 (shown in imaginary line) to the front wheels 5, a pair of left and right knuckle arms 33 connected to opposite ends 32 of the tie rod 31, and a pair of left and right kingpins 34 each connecting the knuckle arm 33 and front-wheel axle 5a which are mounted for rotation about an axis E.

The front wheel driving unit 40 includes a front propeller shaft 41 extending forward from the transmission 11a, a differential gear 42 for the front wheels connected to the front propeller shaft 41, and a pair of left and right front-wheel driving shafts 43 each connecting the differential gear 42 and front-wheel axle 5a. Reference numeral 44 represents a gearbox provided on an intermediate portion of the front propeller shaft 41, which contains a mechanism for changing the rotating speed of the front wheels 5 and a clutch mechanism for connecting or disconnecting the engine power to or from the front wheels 5 as will be later described.

The rear suspension 50 includes a swing arm 51 vertically pivotably mounted on a rear portion of the chassis 4, two connecting members 52 lying between rear ends of two rearward extensions of the swing arm 51, a pair of left and right subbeams 53 vertically pivotably connected to the ends of the connecting members 52, a pair of intermediate-wheel axles 56 rotatably connected to front ends of two forward extensions of the subbeams 53 for undergoing rotation about an axis D, the intermediate wheels 7 each mounted on the associated axle 56, and two pairs of left and right oil dampers 81 and 82. The oil dampers 81 and 82 will be later described in detail in relation to FIG. 3. Reference numeral 5 represents a pivotable cross rod connecting the left and right subbeams 53.

Similarly to the front wheel driving unit 40, the rear wheel driving unit 60 includes a rear propeller shaft 61 extending rearward from the transmission 11a, a differential gear 63 for the rear wheels connected via a universal joint 62 to the rear propeller shaft 61, and a pair of left and right rear-wheel driving shafts 64 connected to the differential gear 63 for undergoing rotation about an axis B. The left and right rear wheels 6 are connected to the left and right rear-wheel driving shafts 64, respectively.

The differential gear 63 for the rear wheels and rear-wheel driving shafts 64 are provided coaxially with the above-mentioned connecting member 52 for pivotal movement therewith, to thereby constitute part of the rear suspension 50. The rear-wheel driving shafts 64 are rotatably threaded through the connecting members 52.

Figure 3:
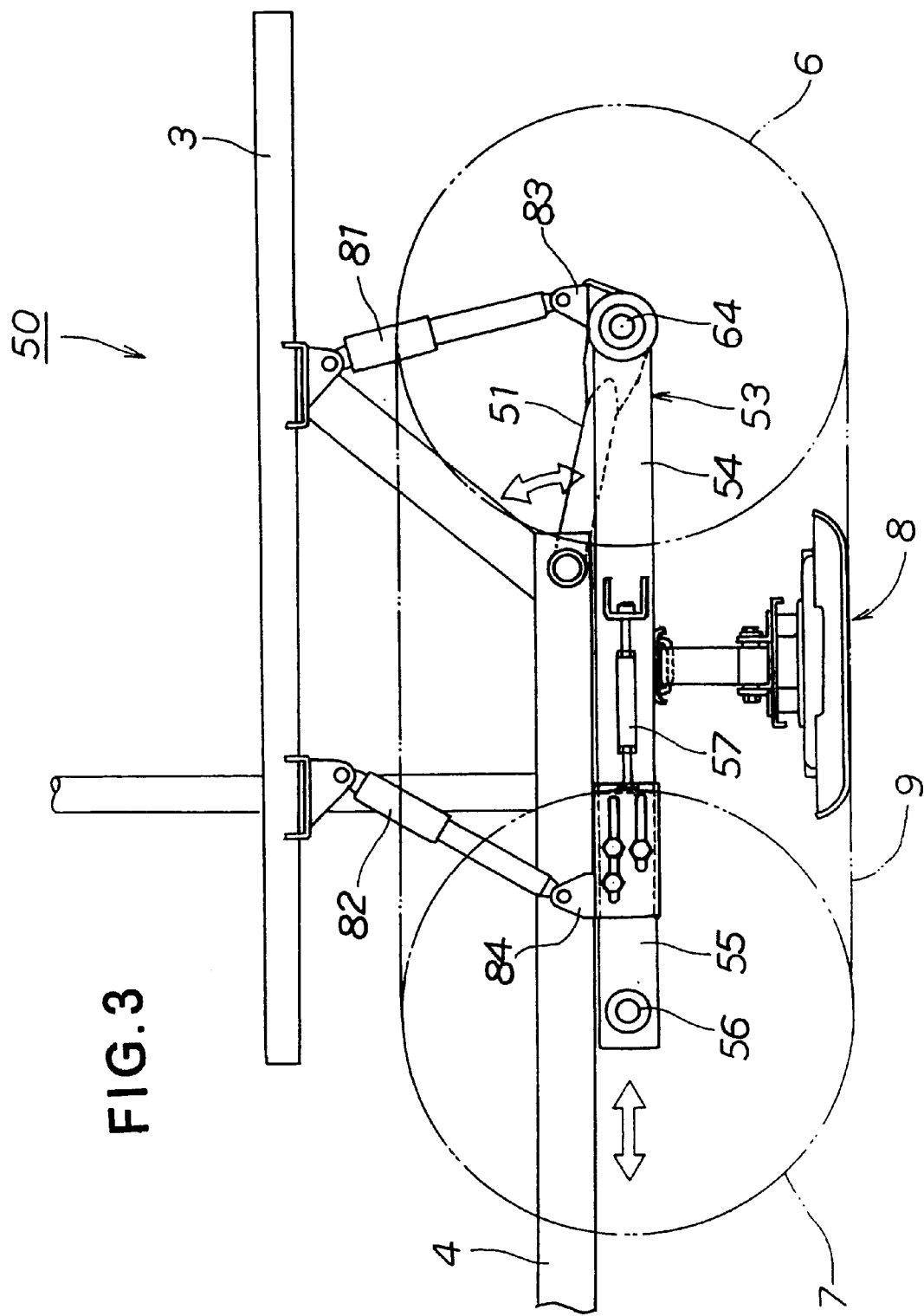
FIG. 3 is an enlarged side view showing details of a rear suspension of the crawler belt vehicle of FIG. 1.

FIG. 3 is an enlarged side view showing details of the rear suspension 50. In the rear suspension 50, the subbeams 53 are suspended from the luggage carrier 3 via the first and second oil dampers (shock absorbers) 81 and 82 connected to proximal (rear) and distal (front) end portions of the subbeams 53.

The tension of the crawler belts 9 is adjustable by means of the subbeams 53. More specifically, each of the subbeams 53 includes a beam member 54 suspended via the oil dampers 81 and 82, a beam extension 55 provided for forward/rearward sliding movement along the front portion of the beam member 54, and a turnbuckle 57 coupling the beam member 54 and beam extension 55 in such a manner to permit a sliding adjustment thereof. This way, the tension of the crawler belt 9 can be adjusted by the associated turnbuckle 57. The beam extension 55 carries the intermediate-wheel axle 5.

Each of the first oil dampers 81 supports the associated (left or right) rear-wheel driving shaft 64 (see FIG. 2) in a suspended fashion via a bracket 83. Each of the second oil dampers 82 supports the associated beam member 54 at the distal end portion thereof (near the intermediate-wheel axle 56) in a suspended fashion via a bracket 84.

Now, a description will be given about experimental results on the running performance of the above-described crawler belt vehicle 1, with reference to FIGS. 4 to 7. Note that the experiment was carried out on a flat snow-covered ground and the running performance of the vehicle 1 was determined on the basis of the vehicle driver's feeling.

Various conditions of the crawler belt vehicle 1 in the experiment were as follows:
(a) total weight of the vehicle 1: about 500 kg;
(b) total weight of the engine 11 with the transmission 11a: about 50 kg
(c) diameter of the tire on each front wheel 5: 33 inch (about 838 mm)
(d) width of the tire on each front wheel 5: 12 inch (about 305 mm)
(e) diameter of the tire on each of the rear and intermediate wheels 6 and 7: 500 mm
(f) distance between the centers of the front and rear wheels 5 and 6: 2,050 mm
(g) distance between the centers of the rear and intermediate wheels 6 and 7: 900 mm
(h) width of each crawler belt 9: 400 mm Further, the "ground contact areas" determining the ground pressure of the front wheels 5 and crawler belts 9 were measured as follows by placing the crawler belt vehicle 1 on a flat hard road surface:
(1) ground contact area of the front wheel tires=area over which the front wheel tires are in contact with the road surface
(i.e., area of a portion of the tires compressed flat by the road surface)
(2) ground contact area of the crawler belts=area over which the crawler belts are in contact with the road surface
(area of a portion of the belt in contact with the road surface)×(width of the belt)

Figure 4:
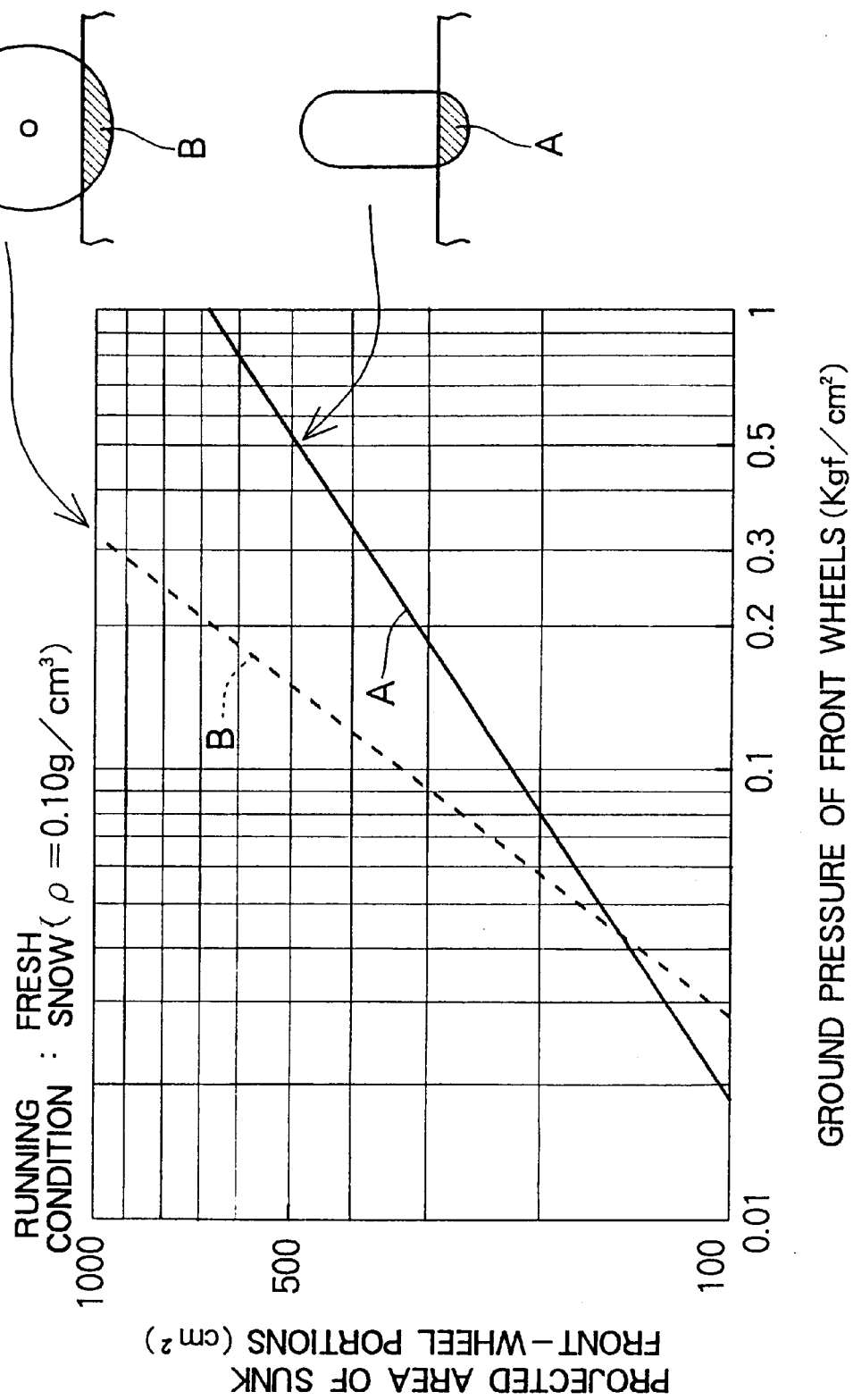
FIG. 4 is a graph showing a variation in projected area measurement of a portion of the vehicle's front wheel tire sinking into a fresh-snow-covered ground.

FIG. 4 is a graph showing a variation in projected area measurement of portions of the front wheels tire sunk into a fresh-snow-covered ground, where the horizontal axis (abscissa) represents ground pressure (kgf/cm$^2$) of the front wheel tires and the vertical axis (ordinate) represents a projected area of the sunk tire portions (cm$^2$) (sunk front-wheel tire portions). Density $\rho$ of the fresh snow was 0.10 g/cm$^3$. Solid straight line A in the graph shows a relationship between the ground pressure of the front wheel tires and the projected area of the sunk tire portions as viewed from the front of the tires, while dotted straight line B shows a relationship between the ground pressure of the front wheel tires and the projected area of the sunk tire portions as viewed from the side of the tires.

The crawler belt vehicle 1 ran in the above-mentioned conditions for evaluation of its running performance. The experimental results were as follows:

(a) When the ground pressure of the front wheel tires was lower than 0.1 kgf/cm$^2$:

The sinking depth of the front wheel tire was too small, and the projected area of the sunk tire portions as viewed from the front and side was small. This resulted in a reduced grip (ground adhesion) and too small steering resistance.

(b) When the ground pressure of the front wheel tires was higher than 0.15 kgf/cm$^2$:

The sinking depth of the front wheel tire was too great, and the projected area of the sunk tire portions as viewed from the front and side was great. This resulted in too great steering resistance, which made the steering operation difficult.

(c) When the ground pressure of the front wheel tires was within a range of 0.1–0.15 kgf/cm$^2$:

The sinking depth of the front wheel tire was appropriate, and the projected area of the sinking tire portions as viewed from the front and side was just right. This resulted in appropriate steering resistance, which achieved good steering performance.

The foregoing experimental results showed that good controllability and running performance are attainable when the ground pressure of the front wheel tires is set within a range of 0.1–0.15 kgf/cm$^2$.

Figure 5:
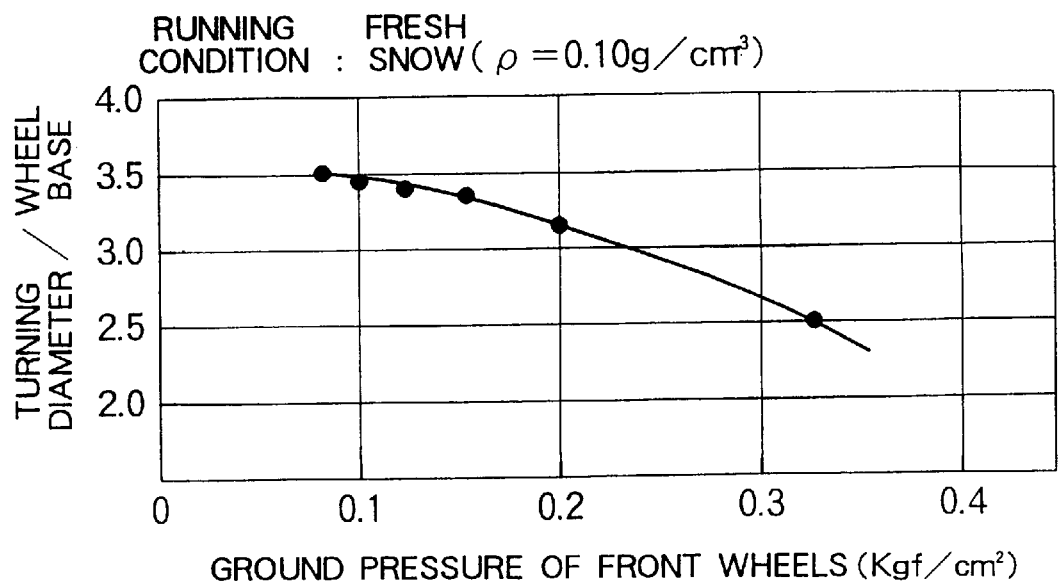
FIG. 5 is a graph showing a variation in turning performance of the crawler belt vehicle on a fresh-snow-covered ground.

FIG. 5 is a graph showing a variation in the sharp-turning performance of the crawler belt vehicle 1 on a fresh-snow-covered ground, where the horizontal axis represents ground pressure (kgf/cm$^2$) of the front wheel tires and the vertical axis represents a ratio of turning diameter to wheelbase. Density ρ of the fresh snow was 0.10 g/cm$^3$. In many cases, the sharp turning performance of half-crawler vehicles are represented by a ratio of turning diameter to wheelbase. The wheelbase represents a distance between the center lines of the front and rear wheels. In general, the ratio of turning diameter to wheelbase in half-crawler vehicles is approximately 3.3–3.5 The experimental result showed that the ground pressure of the front wheel tires satisfying this condition is within a range of 0.1–0.15 kgf/cm$^2$.

Figure 6:
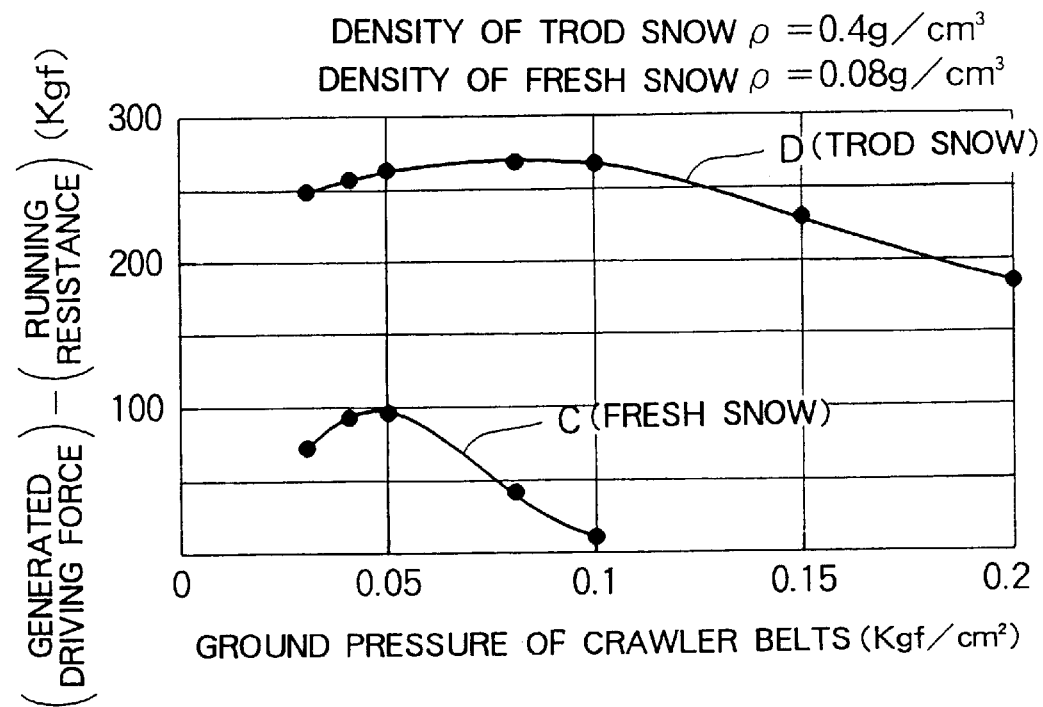
FIG. 6 is a graph showing a variation of traction or pulling performance of the crawler on a snow-covered ground.

FIG. 6 is a graph showing a variation of traction or pulling performance of the crawler on a snow-covered ground, where the horizontal axis represents ground pressure (kgf/cm$^2$) of the crawler belts and the vertical axis represents a value of (generated driving force)–(running resistance) (kgf), i.e., traction. Line C is a plot obtained when the vehicle ran on fresh snow (density ρ=0.008 g/cm$^3$), and line D is a plot obtained when the vehicle ran on trod (compressed) snow (density ρ=0.4 g/cm$^3$).

The experimental result of FIG. 6 showed that the value of (generated driving force)–(running resistance) is the greatest when the crawler belts, set to a ground pressure within a range of 0.04–0.05 kgf/cm$^2$, ran on the fresh snow. When the ground pressure was not higher than 0.04 kgf/cm$^2$ or not lower than 0.05 kgf/cm$^2$, the ground pressure was not sufficient. This indicates that appropriately setting the ground pressure of the crawler belts achieves an optimal value of (generated driving force) (running resistance). Similar results were obtained irrespective of the shape or size of lug patterns formed on the respective treads of the crawler belts.

When the crawler belts ran on a continuous snow cover, the value of (generated driving force)–(running resistance) was far greater than when the crawler belts ran on a fresh snow cover, irrespective of the ground pressure. This showed that when the crawler belts are to run in a very poor running condition, such as on a untrod ground covered with fresh snow, it is preferable to set the ground pressure of the crawler belts within a range of 0.04–0.05 kgf/cm$^2$ because high running performance is required under such a condition.

Figure 7:
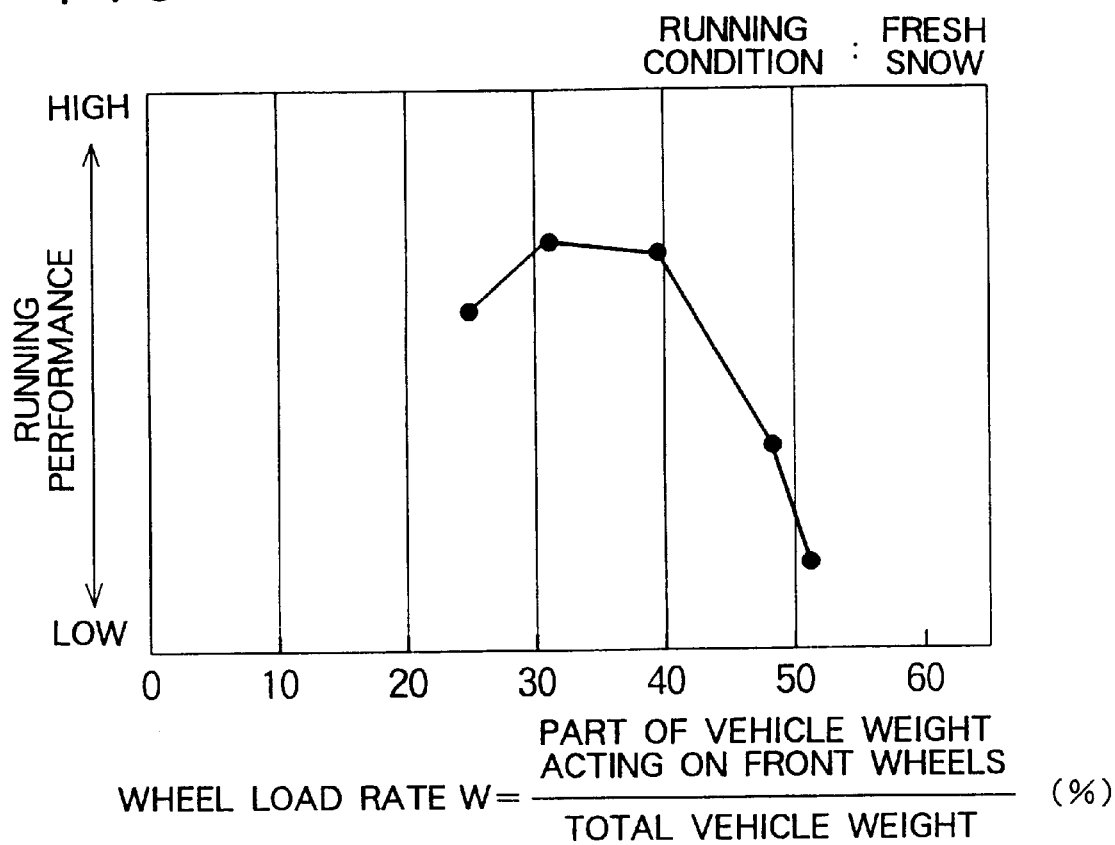
FIG. 7 is a graph showing a variation in running performance of the crawler belt vehicle.

FIG. 7 is a graph showing a variation in running performance of the crawler belt vehicle, where the horizontal axis represents a wheel load rate W (%) of the vehicle weight acting on the front wheels and the vertical axis represents running performance measured. Density ρ of the fresh snow was 0.10 g/cm$^3$. The experimental result of FIG. 7 showed that setting the wheel load rate W to 30–40% achieves the highest running performance on the fresh-snow-covered ground and sufficiently high running performance on a continuous snow cover or muddy ground.

In order to set the wheel load rate W to 30–40%, it is preferable to design the crawler belt vehicle 1 as follows:

(a) first distance L1/third distance L3=0.3;

(b) ratio of first distance Li to second distance L2=2: 1; and (c) weight ratio of intermediate wheel 7 to rear wheel 6=4:6

Note that the crawler belts 9 of the present invention may be made of a flexible material or rigid material. Further, the engine 11 may be provided in such a manner that part or whole of the engine 11 is located within the loops of the crawler belts as viewed sideways.

According to the present embodiment as described above, the ground pressure of the front wheel tires is set within a range of 0.1–0.15 kgf/cm$^2$, and the ground pressure of the crawler belts is set within a range of 0.04–0.05 kgf/cm$^2$. By thus setting the ground pressure of the front wheel tires and crawler belts to respective appropriate values, the controllability and running performance of the vehicle on a snow-covered or other sort of soft ground can be improved to a significant degree.

In addition, the present invention is characterized by positioning the engine between the front and rear ends of the crawler belts, i.e., between the rear and intermediate wheels to thereby place the vehicle's center of gravity nearer to the rear end of the vehicle. This arrangement achieves an appropriate wheel load. As a consequence, the driving mechanisms located between the engine and the crawler belts can be considerably reduced in length and hence in weight, which could substantially reduce the total weight of the vehicle and also enhance the vehicle's running performance on a soft ground.

Figure 8:
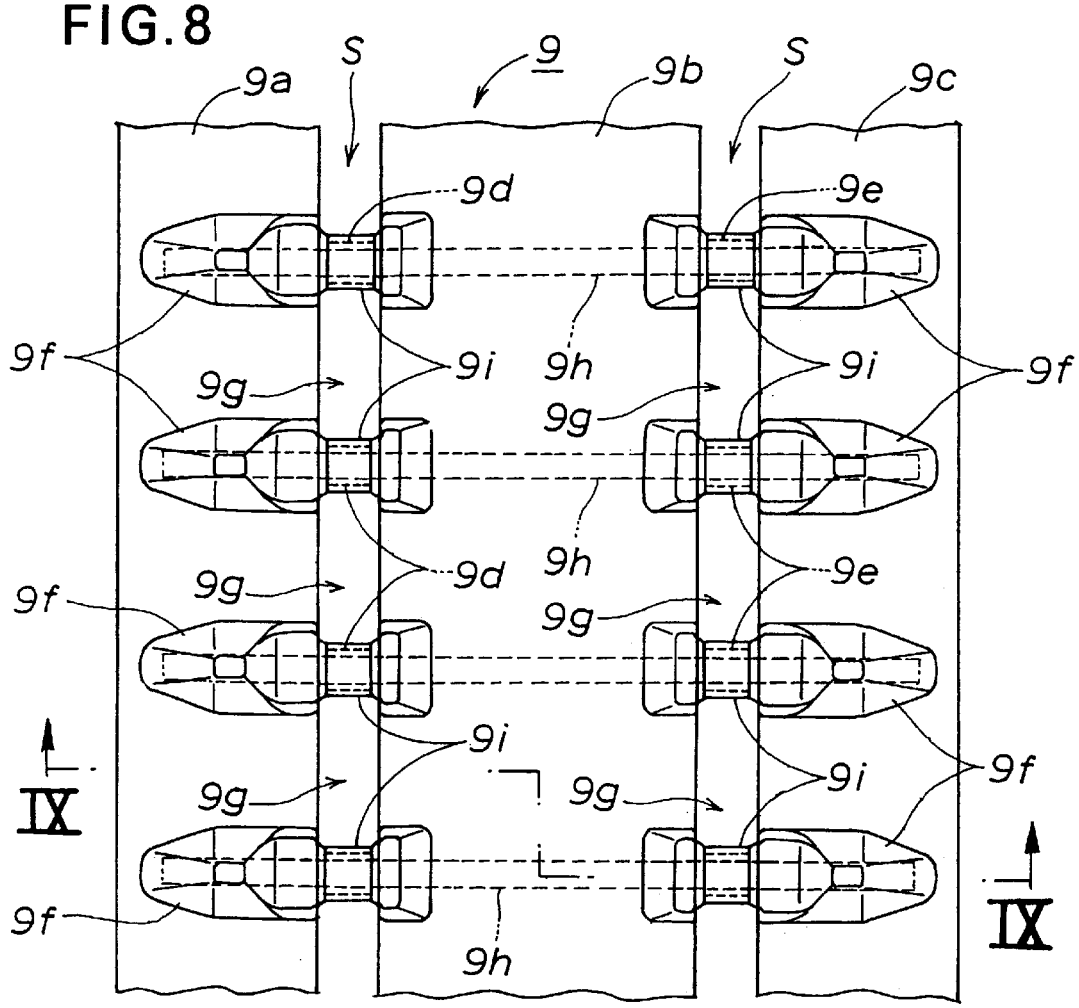
FIG. 8 is a view showing part of the inner surface of the crawler belt, employed in the present invention, in an unfolded state.

FIG. 8 is a view showing part of the inner surface of the crawler belt, employed in the present invention, in an unfolded state. The top-bottom direction in this figure corresponds to the longitudinal direction of the crawler belt. The crawler belt 9 is made of a flexible material such as rubber. A multiplicity of side guide protrusions 9f are formed on the inner surface of the belt 9 along the opposite longitudinal edges, which function to guide the shoulder portions of the associated tires.

The crawler belt 9 comprises a belt body which includes left, central and right belt members 9a, 9b and 9c extending in parallel in the longitudinal direction of the belt 9 and spaced apart from each other with a predetermined gap S. The left and central belt members 9a and 9b are interconnected by means of a plurality of couplers 9d, and similarly the central and right belt members 9b and 9c are interconnected by means of a plurality of couplers 9e. The side guide protrusions 9f are formed on each of the left and right belts 9a and 9c in alignment with each in the longitudinal direction of the crawler belt 9 at predetermined uniform intervals. Similarly, the left and right connectors 9d and 9e are provided in alignment with each other in the longitudinal direction of the crawler belt 9 at predetermined uniform intervals.

A plurality of discharge openings 9g are formed in the crawler belt 9 at predetermined uniform intervals or pitches by the left and right gaps S being divided by the connectors 9d and 9e. These discharge openings 9g extend through the thickness of the crawler belt 9 and function to discharge snow, mud or other foreign substances, drawn into the inner surface area of the belt 9, to outside the belt 9.

Figure 9:
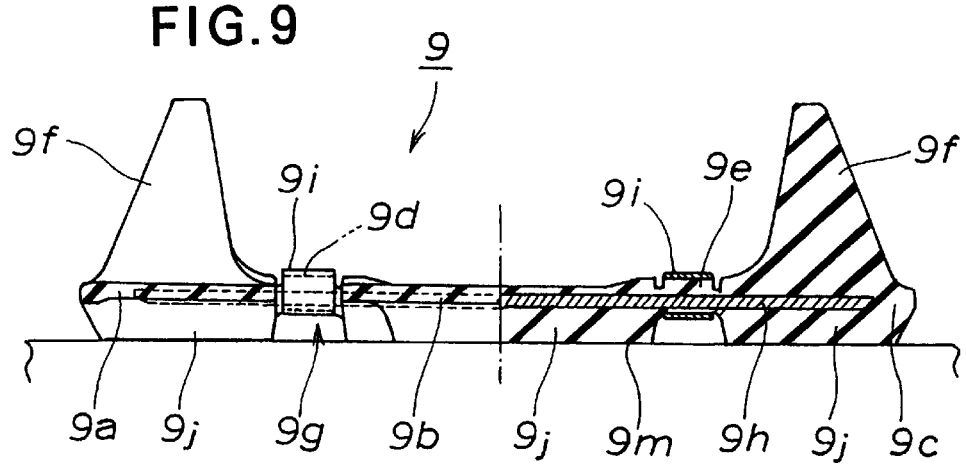
FIG. 9 is a sectional view of the crawler belt taken along the line IX—IX of FIG. 8.

FIG. 9 is a sectional view of the crawler belt 9 taken along the line IX—IX of FIG. 8. The crawler belt 9 includes a plurality of reinforcing core members 9h, made of a metal material, spaced apart from each other by a predetermined distance along the length of the belt 9. and each of the core members 9h is embedded in the belt and extends in the lateral direction of the belt from the left belt member 9a, through the central belt member 9b, to the right belt member 9c. These reinforcing core members 9h function to add to the mechanical strength of the belt 9 against a force acting in the lateral direction of the belt 9.

Each of the couplers 9d and 9e is covered, around the entire outer surface thereof, with a low-friction member 9i integrally formed with the crawler belt 9. Reference numeral 9j represents a pattern of raised and recessed portions formed on the tread 9m of the crawler belt 9, which is a so-called "tread pattern".

Figure 10:
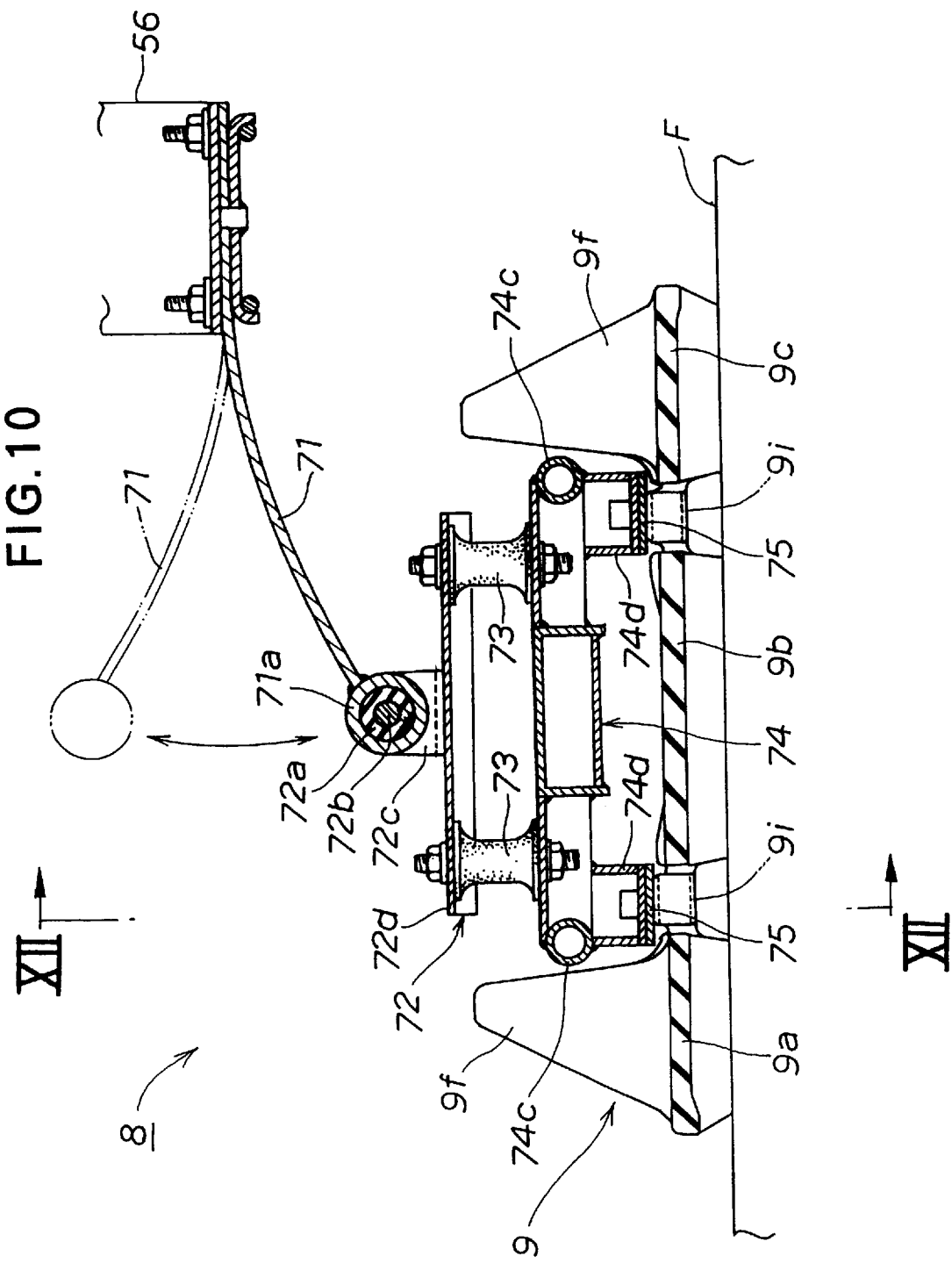
FIG. 10 is a sectional view of an equalizers employed in the present invention.

FIG. 10 is a sectional view of an equalizer 8 employed in the present invention, showing the equalizer 8 attached to the beam member 56. The equalizer 8 includes a leaf spring 71 having its proximal end bolted to the underside of the beam member 56 and its distal end pivotably connected with a base 72, a plurality of resilient members 73 bolted to the underside of the base 72, a support 74 bolted to the lower ends of the resilient members 73, and a pair of left and right sliders 75 removably attached to the underside of the support 74.

The leaf spring 71 normally urges the sliders 75 downward so as to press the crawler belt 9 against the ground F. The leaf spring 71 supports the sliders 75 in such a manner that the, sliders 75 are vertically movable and also swingable in the horizontal direction about the distal end of the spring 71. The leaf spring 71 has a cylindrical boss 71a on the distal end located beyond the width of the vehicle, and the boss 71a extends longitudinally through the crawler belt 9.

Figure 11:
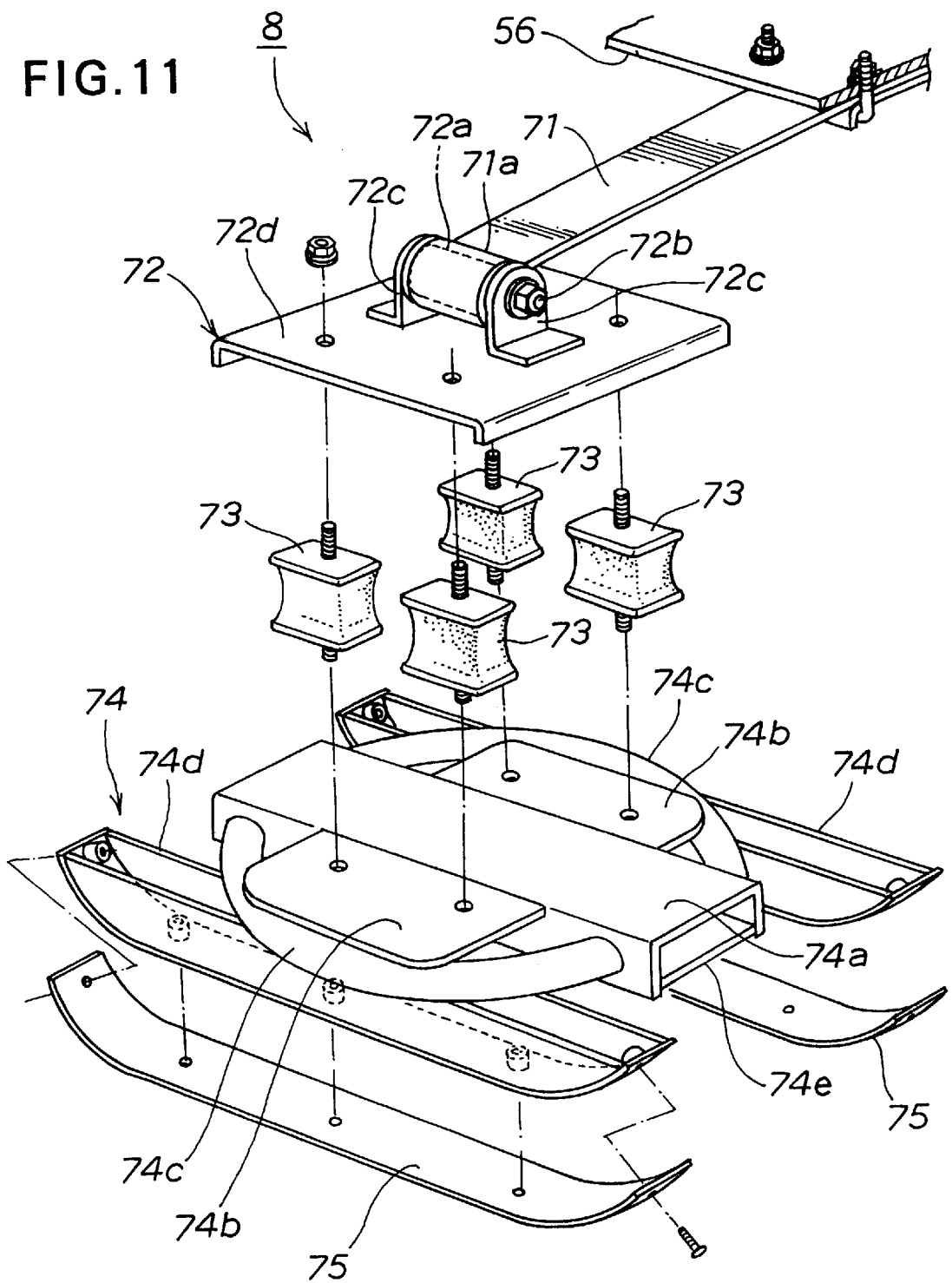
FIG. 11 is an expanded perspective view of the equalizer of FIG. 10.

The base 72 includes a flat base plate 72d, on which a pair of front and rear brackets 72c are provided (see FIG. 11). The boss 71a of the leaf spring 71 extends between the front and rear brackets 72c. The boss 71a accommodates therein a resilient bush 72a, and an elongate pin 72b is received in the bush 72a and extends centrally through the bush 72a. The elongate pin 72b is supported at its opposite ends by the brackets 72c. In this way, the base 72 is rotatable via the brackets 72c about the pin 72c. The support 74 is held in place by means of the side guide protrusions 9f and supports thereon the base 72.

FIG. 11 is an expanded perspective view of the equalizer 8 of FIG. 10. As shown, the support 74 includes a support base 74a generally in the shape of a downwardly-opening channel, a pair of left and right support plates 74b secured to the opposite sides of the support base 74a, a pair of arcuate support arms 74c secured to the opposite sides of the base 74a below the support plates 74b, and a pair of left and right rails 74d secured to the underside of the arcuate support arms 74c.

The downward opening of the channel-shaped support base 74a is closed by a reinforcing rib 74e, and each of the left and right support plates 74b is attached to the base 72 by means of a pair of the resilient members 73. The arcuate support arms 74c are formed by cutting an oval-shaped pipe in halves. Each of the rails 74d, which is in the shape of an upwardly-opening box, is secured at the top of opposed side walls thereof to the underside of the associated arcuate support arm 74c. The bottom of each of the rails 74d is generally in the shape of an elongate plate extending in the longitudinal direction (left-right direction in the figure) of the crawler belt 9, and the bottom has opposite end portions bending upward. Each of the sliders 75 is an elongate plate removably screwed to the underside of the associated rail 74d, which is made of a material having a lower frictional coefficient than that of the crawler belt 9.

Figure 12:
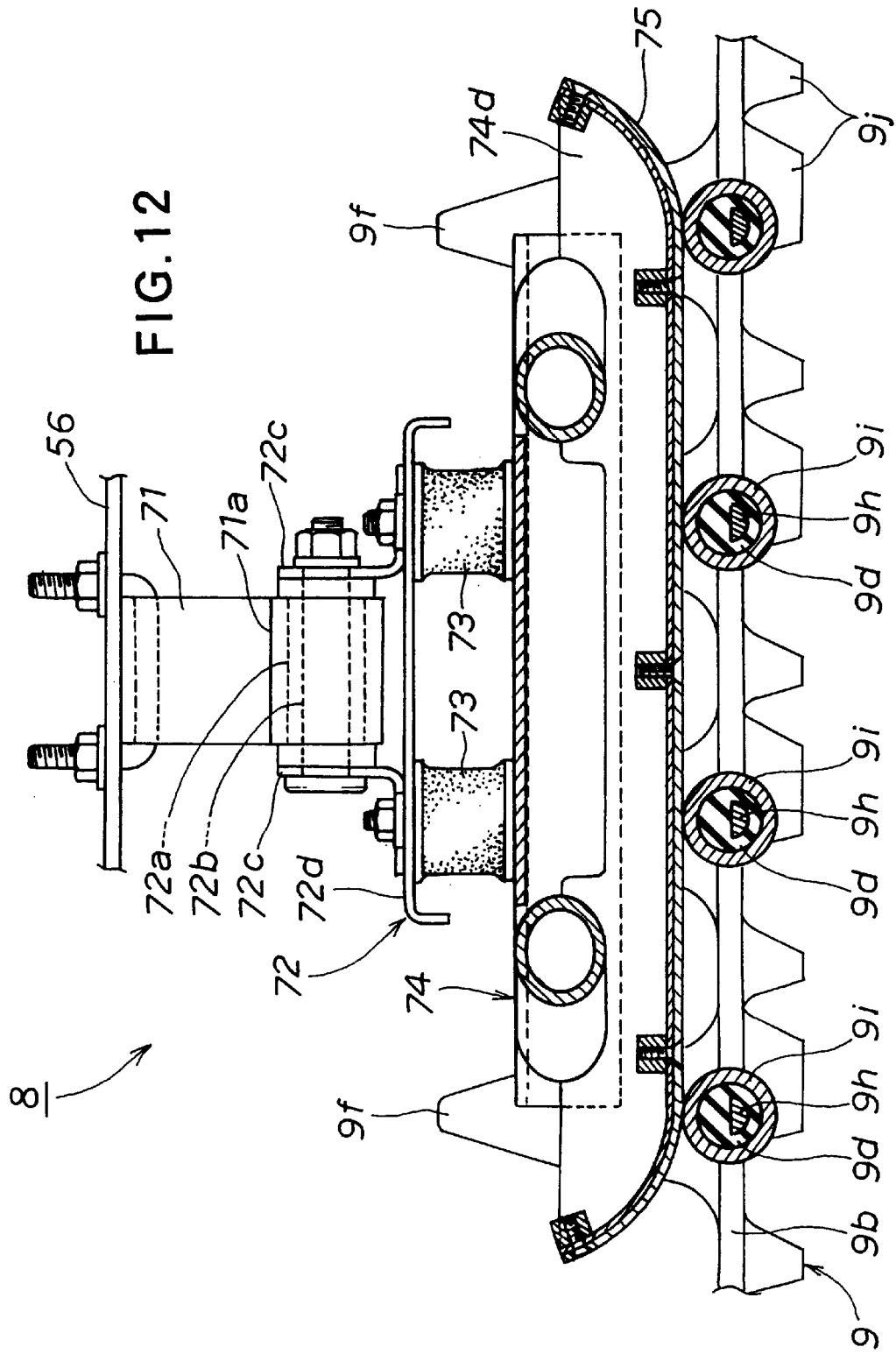
FIG. 12 is an enlarged sectional view of the equalizer taken along the line XII—XII of FIG. 10.

FIG. 12 is an enlarged sectional view of the equalizer taken along the line XII—XII of FIG. 10, showing the crawler belt 9 pressed downward by the slider 75 of the equalizer 8. The low-friction members 9i, which are disposed at predetermined intervals or pitches along the length of the crawler belt 9, project in part beyond the upper and lower surfaces of the crawler belt members (flat crawler belt portions). The slider 75 is slidably carried on these low-friction members 9i. Thus, the slider 75 is positioned at a distance from the flat crawler belt portions. Whereas each of the low-friction members 9i is shown as having a hollow cylindrical shape, it may be of any other shape as long as at least the portion of the member slidably contacting the slider 75 is in a circular shape. Because, such a circular shape reduces the area of sliding contact with the slider and hence minimizes the frictional resistance.

The following are exemplary combinations of the materials used for the low-friction members 9i and slider 75:

(1) The low-friction members 9i is made of low-friction-resin, low-friction rubber, steel or aluminum which has a lower frictional coefficient than the rubber-made crawler belt 9, while the slider 75 is made of low-friction resin having a lower frictional coefficient than the crawler belt 9; and (2) The low-friction members 9i is made of low-friction rubber which has a lower frictional coefficient than the rubber-made crawler belt 9, while the slider 75 is made of steel or aluminum.

Examples of the low-friction resin include poly vinyl chloride (PVC) and polytetrafluoroethylene resin (Teflon:trademark). The low-friction rubber may be made by kneading together a rubber material similar to that of the crawler belt 9 and polypropylene resin powder. Any other combination of materials of the low-friction members 9i and slider 75 than the above-mentioned may be employed as long as it is useful in reducing the frictional resistance between the low-friction members 9i and the slider 75.

The following are results of experiments using different combinations of materials of the low-friction members 9i and slider 75:

(Conventional Combination)

The low-friction members 9i were made of rubber, while the slider 75 was made of hard poly vinyl chloride resin. This combination presented a frictional (resistance) coefficient of 0.18.

(Combination According to an Embodiment of the Invention)

The low-friction members 9i were made of a material produced by kneading together a rubber material similar to that of the crawler belt 9 and polypropylene resin powder, while the slider 75 is made of rigid poly vinyl chloride resin. This combination presented a frictional (resistance) coefficient of 0.8.

These results showed that the combination of the present invention presents very small frictional resistance and are very useful for improved performance of the crawler belts in the crawler belt vehicle 1. Particularly, the driving capability of the crawler belts could be significantly enhanced with the low-friction members 9i and slider 75 using the combination of the invention.

Now, exemplary operation of the equalizers 8 and crawler belts 9 will be described with reference to FIGS. 12 and 13. Note that whereas only one of the equalizers 8 and crawler belts 9 are shown and described here, the other equalizer 8 and crawler belt 9 operate in the same manner as the one equalizer 8 and crawler belt 9. As shown in FIG. 12, the slider 75 of the equalizer 8 presses the crawler belt 9 by means of the low-friction members 9i. Because the low-friction members 9i are spaced apart from each other along the length of the crawler belt 9 and each have a lower frictional coefficient than the crawler belt 9, only small frictional resistance occurs as the slider 74 slides on the low-friction members 9i.

Further, because the slider 5 is positioned at a distance from the flat crawler belt portions, no frictional resistance occurs therebetween. By thus reducing the frictional resistance between the equalizer 8 and crawler belt 9, the crawler can run with reduced running resistance and frictional heat. The reduced frictional heat will prolong the life of the crawler belt 9. Besides, by the crawler belt 9 being pressed, via the slider 75 of predetermined length, against the ground with an appropriate force, the grip or ground adhesion of the crawler belt 9 never decreases. Furthermore, because the low-friction members 9i are each in a hollow cylindrical shape, the area of their contact with the slider 75 is quite small, and thus the frictional resistance between low-friction members 9i and slider 75 can be even further reduced.

Figure 13:
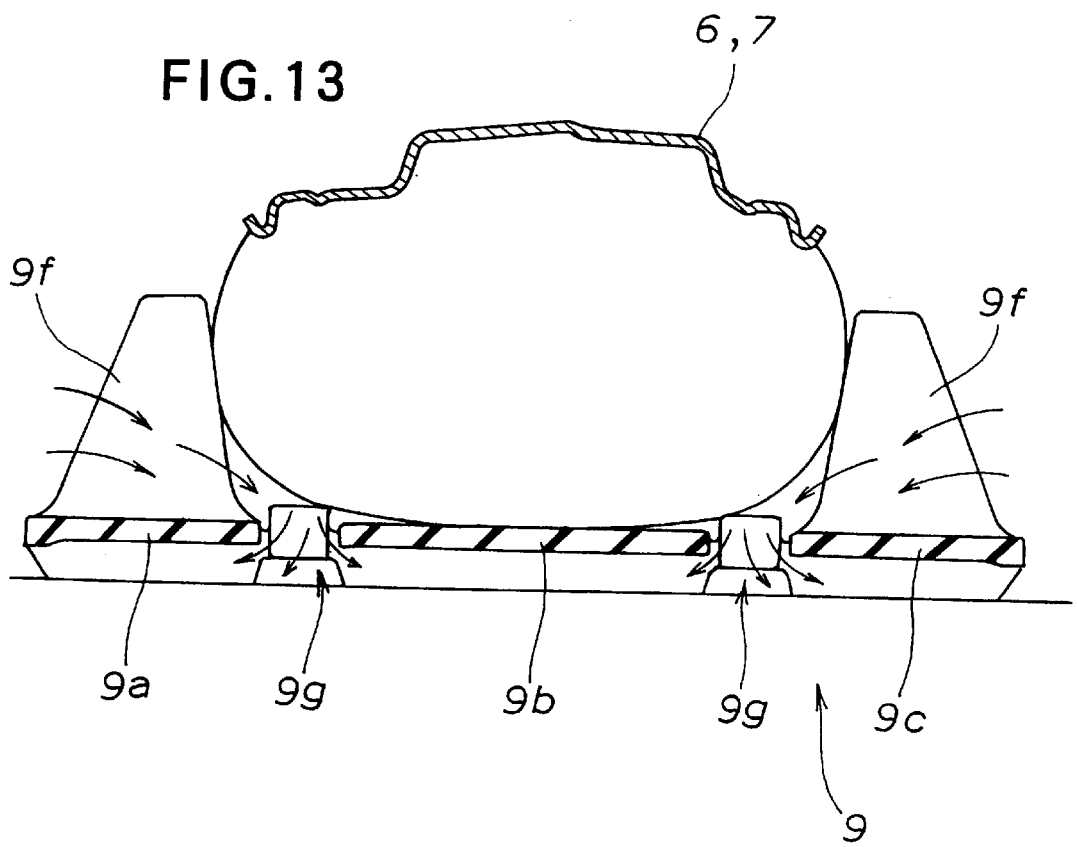
FIG. 13 is a view showing a manner in which foreign substances, such as snow or mud, drawn into an inner surface area of the crawler belt are let out through discharge openings.

FIG. 13 is a view showing a manner in which foreign substances, such as snow, drawn into an inner surface area of the crawler belt are let out through the discharge openings 9g. As shown in FIG. 8, the discharge openings 9g are each formed between the side guide protrusions 9f adjoining in the front-rear direction of the crawler belt 9, so that the openings 9g are located along the opposite longitudinal edges of the central belt member 9b. Thus, foreign substances, such as snow or mud, drawn into an inner surface area of the crawler belt 9 from the opposite sides thereof through between the protrusions 9f as denoted by inward arrows, can be promptly let out through the discharge openings 9g as shown by downward arrows before they reach the central belt member 9b. As a consequence, foreign substances, such as snow or mud, are effectively prevented from reaching and clogging the tread pattern of the rear wheel 6 or intermediate wheel 6. Therefore, the necessary frictional engagement between the wheel tires and crawler belt is guaranteed with no possibility of slippage therebetween, so that efficient transmission of the driving force from the tires to the crawler belt can be maintained.

The thus-arranged crawler belt vehicle 1 was tested for its, running performance on a snow-covered ground, and it was visually confirmed that the discharge openings 9g could effectively function to let out snow drawn into the inner surface area from the sides of the crawler belt 9.

The discharge openings 9g can be formed in a laterally central portion of the crawler belt 9, in which case, however, snow drawn into an area between the tread pattern of the tires and the belt 9 may be readily compressed. The compressed snow could clog the tread pattern or be firmly adhered to or even turn into ice on the inner surface of the crawler belt 9. As a result, the frictional resistance between the tires and crawler belt 9 would be lowered to cause unwanted slippage therebetween. Therefore, it is desired that the discharge openings 9g be formed along opposite longitudinal edge portions of the crawler belt 9 as in the illustrated example of FIG. 13.

Figure 14:
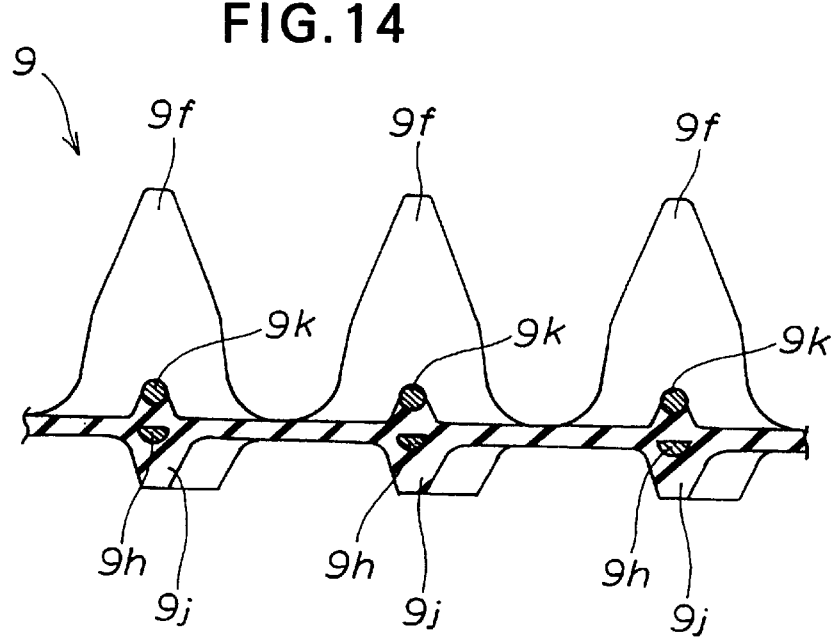
FIG. 14 is a sectional view showing a modification of the crawler belt employed in the present invention.

FIG. 14 is a sectional view showing a modified embodiment of the crawler belt 9 employed in the present invention. The left-right direction in the figure corresponds to the longitudinal direction of the crawler belt 9. This modified crawler belt 9 is characterized in that a plurality of low-friction members 9k, each having a columnar shape and extending in the lateral direction of the belt 9, are provided in spaced-part parallel relation to each other in the longitudinal direction of the belt 9 and that each of the low-friction members 9 is located immediately above the associated reinforcing core member 9h and projects inward from the inner surface of the belt 9. This modified crawler belt 9 is much simpler in construction than the above-described crawler belt 9 of FIG. 12 having the hollow cylindrical low-friction members 9i each enclosing the associated reinforcing core member 9h.

In the above-described embodiments of the present invention, the crawler belt 9 may be made of a rigid material rather than a flexible material. The discharge openings 9g may be of any desired shape and size; for example, they may be in the shape of a circular aperture as viewed in plan. Further, the low-friction members 9i and 9k may be of any desired shape, size, pitch and material as long as they are maintained apart from the crawler belt 9. Also, the low-friction members 9i and 9k may be rotatable hollow cylinders.

As has been described, the crawler belt of the present invention is characterized by a plurality of the discharge openings for letting out foreign substances, such as snow or mud, drawn into an inner surface area of the crawler belt 9. With this arrangement, the snow or mud drawn into an area between the tires and crawler belt can be let out efficiently so that the efficiency in transmitting the driving force from the tires to the crawler belt can be maintained at a sufficient level.

Figure 15:
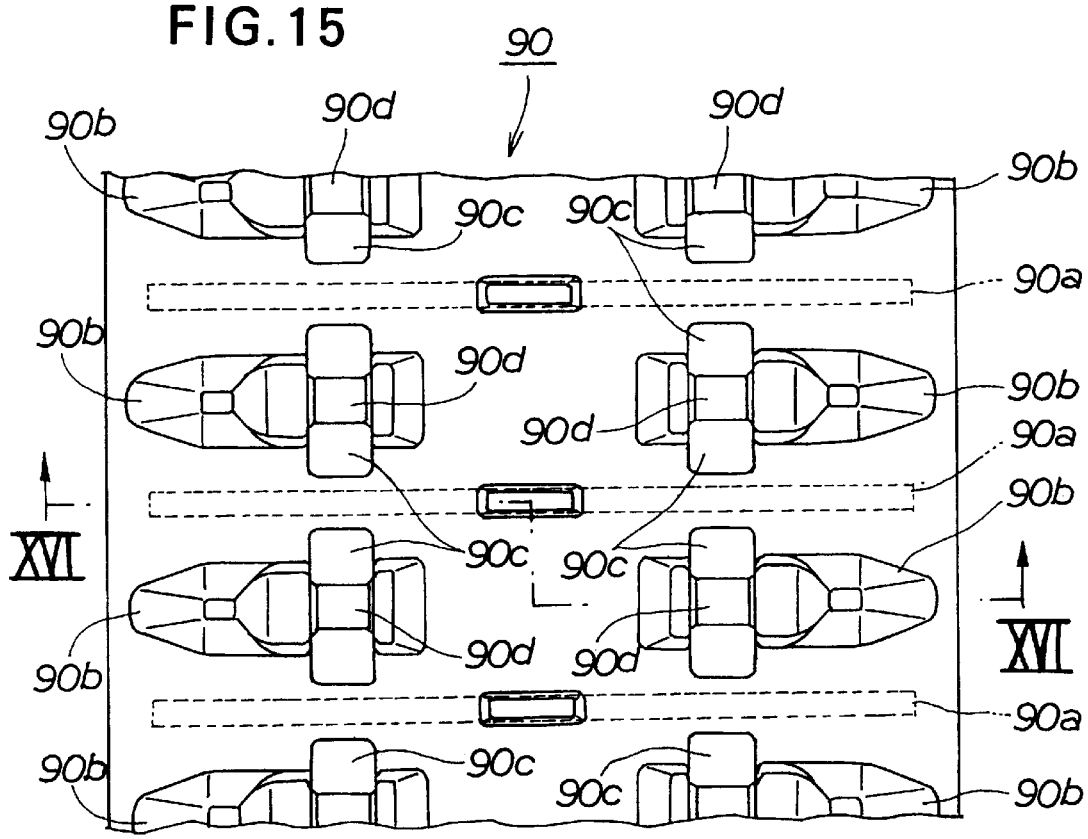
FIG. 15 is a view showing part of the inner surface of a modified crawler belt in an unfolded state.

FIG. 15 is a view showing part of the inner surface of a modified crawler belt 90 in an unfolded state. In FIG. 15, the crawler belt 90 is made of a flexible material, such as rubber, and has a multiplicity of reinforcing cross members 90a embedded therein and extending in the lateral direction of the belt 90. Reference numeral 90b represents a multiplicity of side guide protrusions formed along opposite longitudinal edges of the crawler belt 90, which function to prevent the tires from being accidentally detached from the belt 90. The reinforcing cross members 90a may each be in the form of a steel rod.

The crawler belt 90 also has a multiplicity of discharge openings 90c in corresponding relations to the side guide protrusions 90b, each of which is located adjacent to the inner side of the associated side guide protrusion 90b. As in the above-described embodiment, these discharge openings 90c are through-holes for letting out foreign substances, such as snow or mud, drawn into an inner surface area of the crawler belt 90. A rod-shaped connecting member 90d spans the central part of each of the discharge openings 90c. The left and right side guide protrusions 90b, discharge openings 90c and connecting members 90d are in alignment with each other in the lateral direction of the crawler belt 90 and spaced apart from each other by a predetermined distance in the longitudinal direction of the crawler belt 90.

Figure 16:
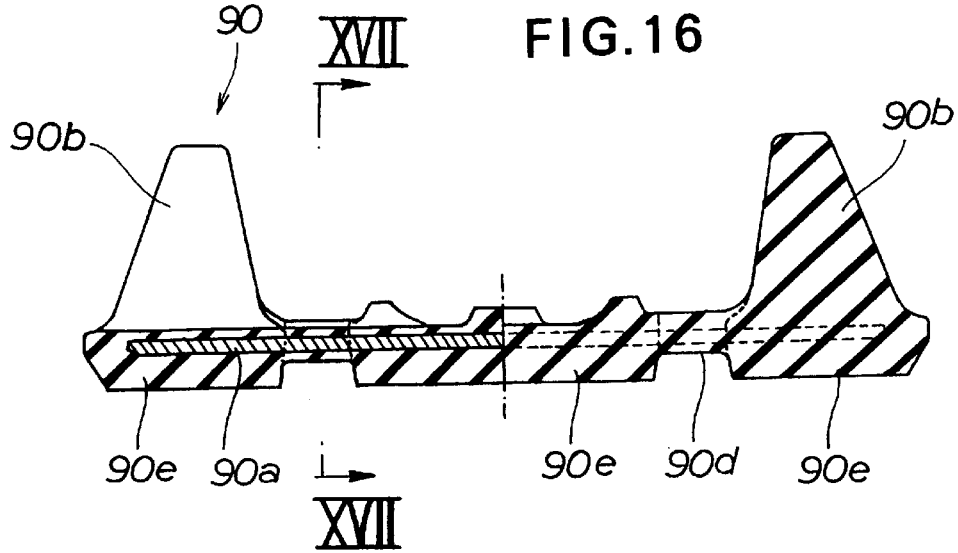
FIG. 16 is a sectional view of the crawler belt taken along the line XVI—XVI of FIG. 15.

FIG. 16 is a sectional view of the crawler belt 90 taken along the line XVI—XVI of FIG. 15, where the reinforcing cross member 90a extends substantially across the entire width of the crawler belt 90 to thereby increase the lateral rigidity of the belt 90 and the rigidity of the proximal end portion of the side guide protrusions 90b against a lateral bending force. That is, each of the side guide protrusions 90b is protected by a pair of the reinforcing cross members 90a embedded in spaced apart relation to each other in the longitudinal direction of the belt 9. Reference numeral 90e represents a pattern of raised and recessed portions (tread pattern) formed on the tread of the crawler belt 90.

Figure 17:
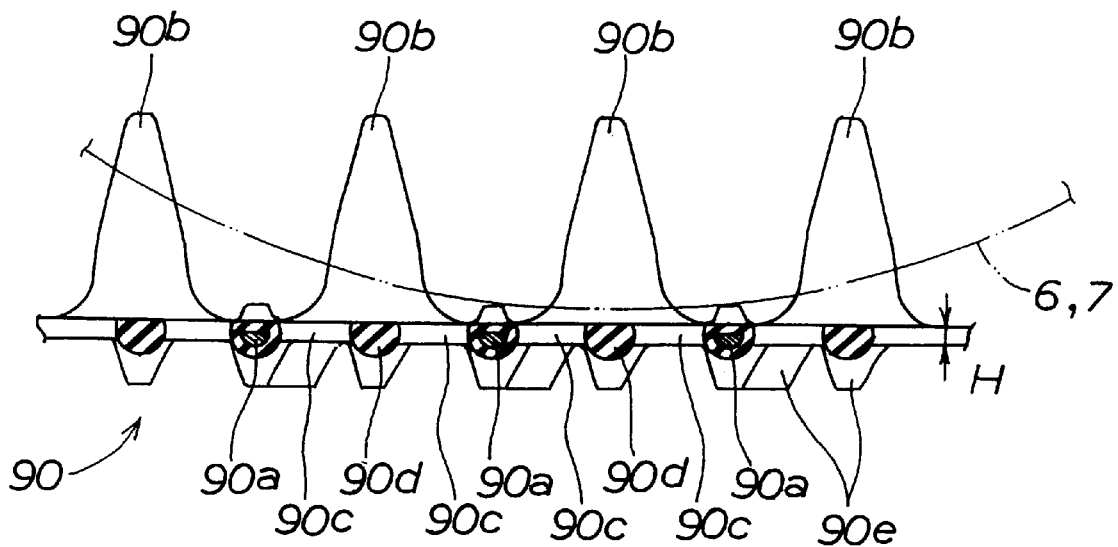
FIG. 17 is a sectional view of the crawler belt taken along the line XVII—XVII of FIG. 16.

FIG. 17 is a sectional view of the crawler belt 90 taken along the line XVII—XVII of FIG. 16, showing how each of the reinforcing cross members 90a is provided centrally between the side guide protrusions 90b spaced apart of each other in the longitudinal direction (left-right direction in the figure) of the crawler belt 9.

With reference to FIG. 17, the following paragraphs describe exemplary operation of the crawler belt 90 arranged in the abovementioned manner. With the reinforcing cross members 90a each embedded in the belt 90 between adjacent side guide protrusions 90b, each of the guide protrusions 90b is effectively protected by two adjacent the reinforcing cross members 90a spaced apart from each other in the longitudinal direction of the belt 9. Thus, the reinforcing cross members 90a, functioning to increase the rigidity of the side guide protrusions 90b, can be reduced in diameter, which makes it possible to substantially reduce the thickness (base gauge) H of the crawler belt 90. As a consequence, the bending rigidity of the side guide protrusions 90b can be enhanced without increasing the thickness H of the crawler belt 90.

Figure 18:
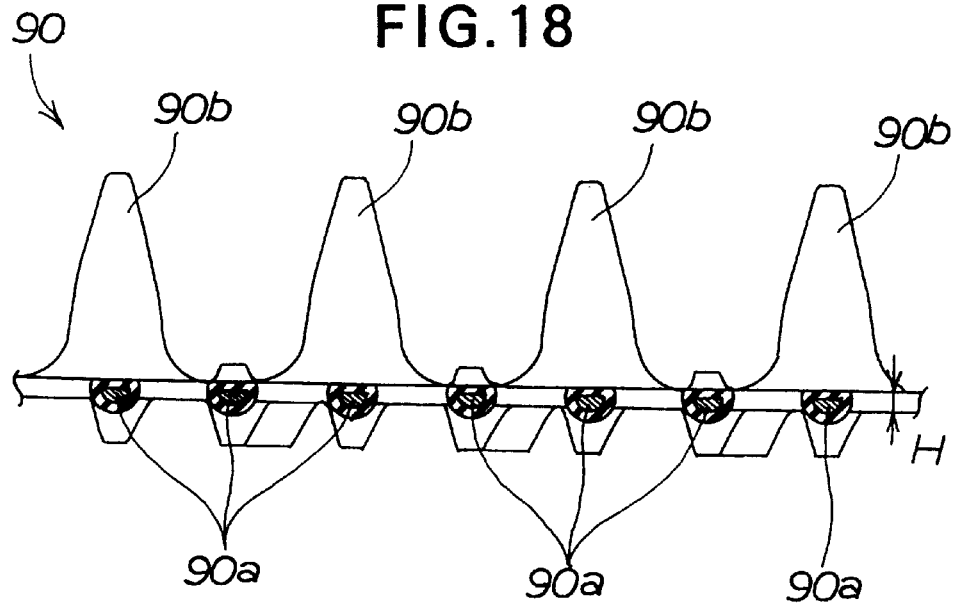
FIG. 18 is a sectional view showing a modification of the crawler belt of FIG. 17.

FIG. 18 is a sectional view similar to FIG. 17 but showing a modification of the crawler belt 90 illustrated in FIGS. 15 to 17. This modified crawler belt 90 is characterized in that the reinforcing cross members 90a are embedded in the belt 90 not only between adjacent side guide protrusions 90b but also at the bottom of each side guide protrusion 90b. According to this modification, each of the side guide protrusions 90b is reinforced by cooperation of three reinforcing cross members 90a, i.e., ont only by the members 90a located on both sides thereof but also by the member 90a located at the bottom thereof. Thus, each of the reinforcing cross member 90a may be of smaller diameter than in the embodiment of FIGS. 15 to 17, and hence the thickness H of the crawler belt 90 can be even further reduced.

With these reinforcing cross members 90a, the crawler belt 90 of FIG. 18 presents an enhanced rigidity against bending and twisting forces so that local resilient deformation of the belt 90 can be effectively avoided. As a result, a greater effective ground contact area of the crawler belt 90 is provided, which would lead to a reduced ground pressure of the belt 90. Accordingly, the crawler belt vehicle with the thus-constructed belt 90 will present enhanced running performance on a soft ground.

As a further modification, a plurality of the reinforcing cross members 90a may be provided between every adjacent side guide protrusions 90b. The reinforcing cross members 90a may be made of any desired material, such as metal or hard plastic material, which provides enhanced rigidity of the crawler belt 90.

With the reinforcing cross members 90a embedded in the belt 90 between adjacent side guide protrusions 90b, each of the guide protrusions 90b is effectively protected by the reinforcing cross members 90a spaced apart from each other in the longitudinal direction of the belt 90. Thus, the reinforcing cross members 90a, functioning to increase the rigidity of the side guide protrusions 90b, can be reduced in diameter, which makes it possible to substantially reduce the thickness (base gauge) H of the crawler belt 90. As a consequence, the bending rigidity of the side guide protrusions 90b can be enhanced without increasing the thickness H of the crawler belt 90.

Figure 19:
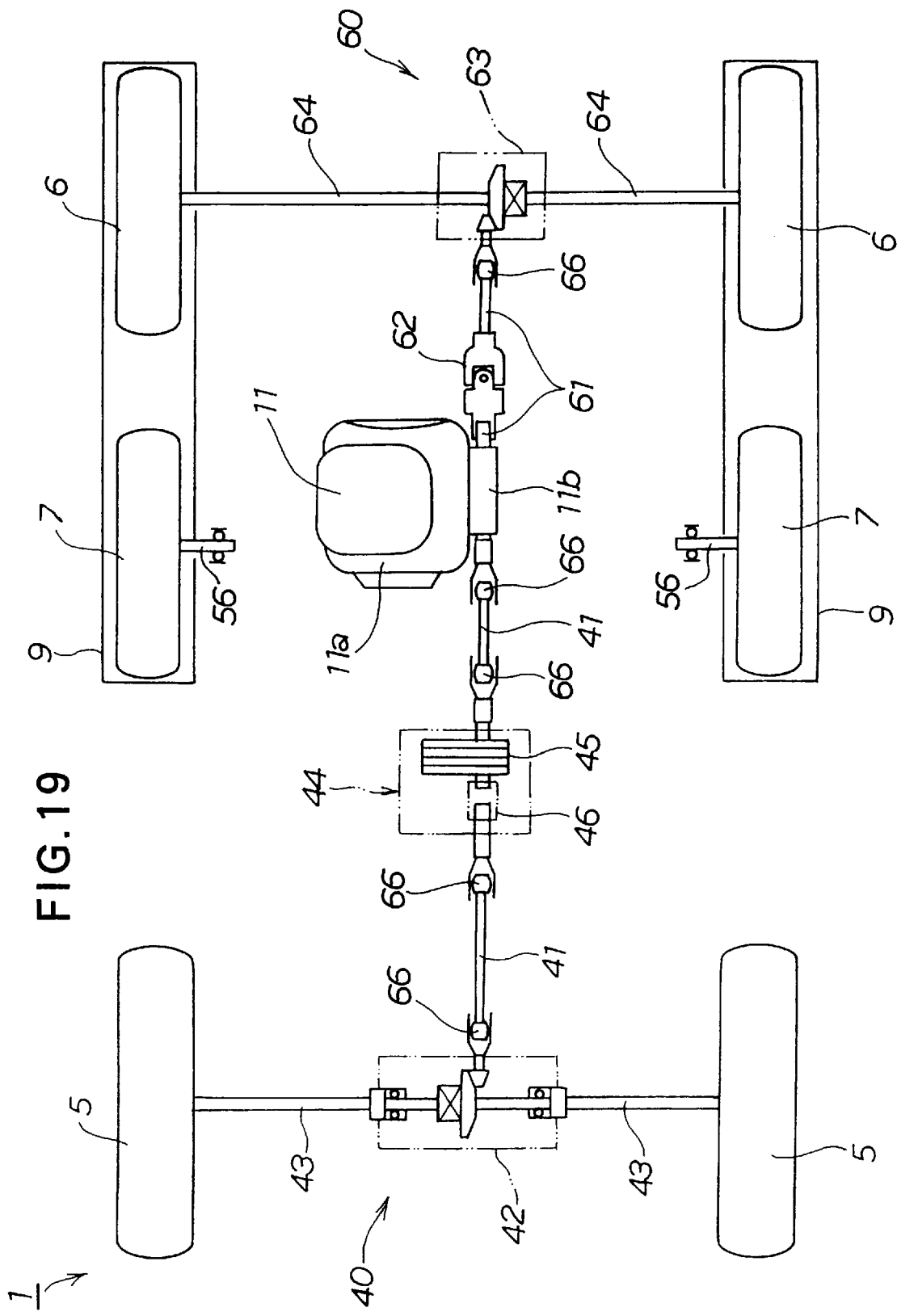
FIG. 19 is a view schematically showing driving units for the front and rear wheels of the vehicle.

FIG. 19 is a view schematically showing in detail driving units 40 and 60 for the front and rear wheels of the crawler belt vehicle 1 shown in FIG. 2.

The front-wheel driving unit 40 includes the front propeller shaft 41 extending forward from an output section 11b of the transmission 11a, and the front-wheel differential gear 42 is connected to the front propeller shaft 41. The left and right front-wheel driving shafts 43 connect between the differential gear 42 and the respective front-wheel axles 5a (FIG. 2). The gearbox 44 is provided on an intermediate portion of the front propeller shaft 41 between the engine 11 and the front-wheel driving shafts 43, and this gearbox 44 contains the mechanism 45 for changing the rotating speed of the front wheels 5 and the clutch mechanism 46 for connecting or disconnecting the engine power to or from the front wheels 5.

The rear-wheel driving unit 60 includes the rear propeller shaft 61 extending rearward from the output section 11b of the transmission 11a, and the rear-wheel differential gear 63 is connected via the universal joint 52 to the rear propeller shaft 61. The left and right rear-wheel driving shafts 64 are connected to the differential gear 63 to drive the rear wheels 6. Reference numeral 66 represents constant velocity joints mounted on the front and rear propeller shafts 41 and 61.

The following paragraphs describe exemplary operation of the front-wheel driving unit 40 and rear-wheel driving unit 60, with reference to FIGS. 20A to 20D.

Figure 20A:
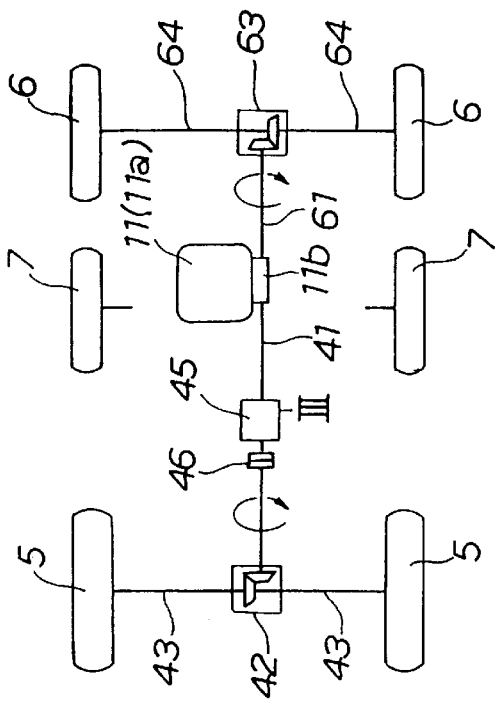
FIGS. 20A to 20D are diagrams explanatory of exemplary operation of a front-wheel driving unit and a rear-wheel driving unit of the crawler belt vehicle.

In FIG. 20A, the front wheels 5 are provided with small-diameter tires, the crawler belts 9 are attached in the respective predetermined positions, and the clutch mechanism 46 is in the "connecting" position. In this case, the speed changing mechanism 45 is set at speed stage I such that the rotating speed of the front wheel's small-diameter tires coincides with that of the crawler belts 9, so that the crawler belt vehicle 1 is allowed to run smoothly via the front and rear wheels 5 and 6 being driven via the front and rear propeller shafts 41 and 61, respectively.

Figure 20B:
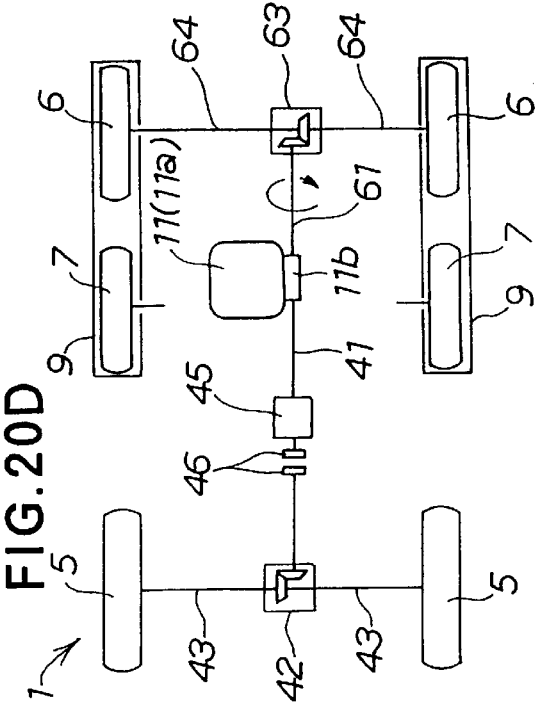

In FIG. 20B, the front wheels 5 are provided with large-diameter tires, the crawler belts 9 are attached in the respective predetermined positions, and the clutch mechanism 46 is in the "connecting" position. In this case, the speed changing mechanism 45 is set at speed stage II such that the rotating speed of the front wheel's large-diameter tires coincides with that of the crawler belts 9, so that the crawler belt vehicle 1 is allowed to run smoothly via the driven front and rear wheels 5 and 6.

Figure 20C:
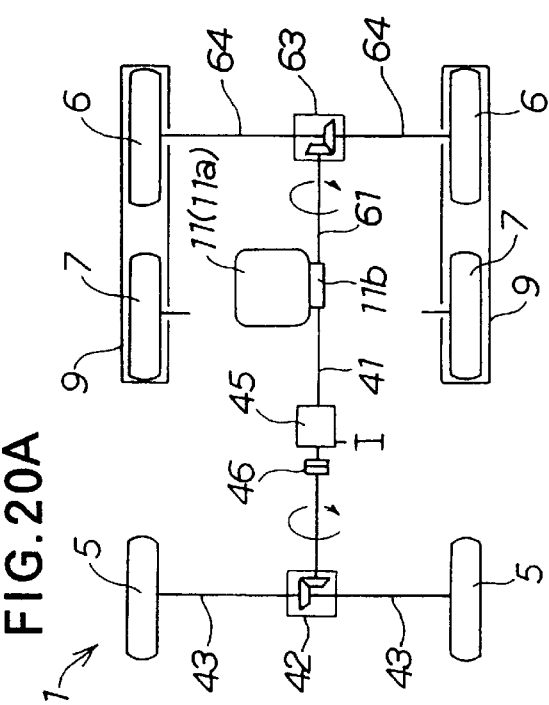

In FIG. 20C, the front wheels 5 are provided with large-diameter tires, the crawler belts 9 are removed from the predetermined positions, and the clutch mechanism 46 is in the "connecting" position. In this case, the speed changing mechanism 45 is set at speed stage III such that the rotating speed of the front wheel's large-diameter tires coincides with that of the crawler belts 9, so that the crawler belt vehicle 1 is allowed to run smoothly via the driven front and rear wheels 5 and 6.

Figure 20D:
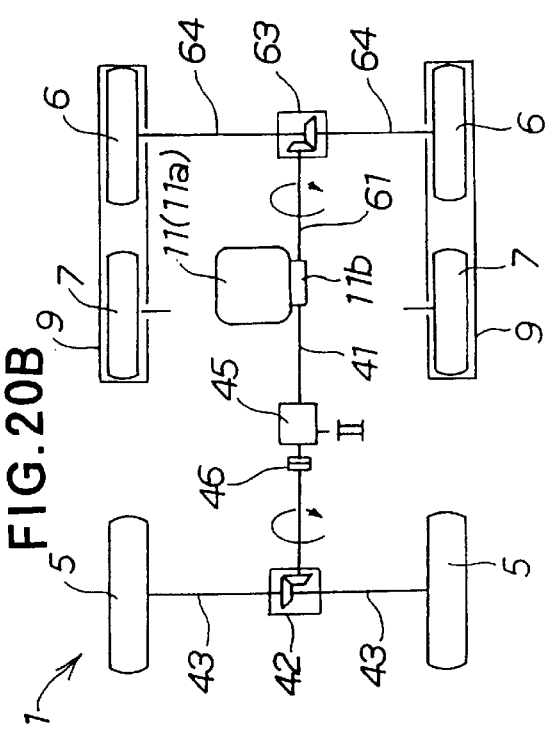

In FIG. 20D, the front wheels 5 are provided with large-diameter tires, the crawler belts 9 are attached in the respective predetermined positions, and the clutch mechanism 46 is in the "disconnecting" position. In this case, the crawler belt vehicle 1 is allowed to run only via the rear wheels 6 driven by the rear propeller shaft 61.

Thus, according to the invention, the crawler belt vehicle 1 is allowed to run smoothly irrespective of the presence or absence of the crawler belts 9 or the diameter of the front wheel tires.

FIG. 21 is a perspective view showing details of the rear suspension 50 of the vehicle 1. The rear suspension 50 includes the U-shaped swing arm 51 mounted on a rear portion of the chassis 4 for undergoing pivotal movement relative to the chassis 4 about an axis A. Two vertically movable connecting members 52 connected between rear ends of two rearward extensions of the swing arm 51.

The left and right rear-wheel driving shafts 64 are threaded through the respective connecting members 52. The left and right subbeams 53 are vertically pivotally connected to the distal ends of the respective connecting members 52, and the intermediate-wheel axles 56 are rotatably connected to the front ends of the respective subbeams 53. The intermediate wheels 7 (FIG. 2) are mounted on the respective axles 56, and the driving rear wheels, 6 (FIG. 2) are mounted on the respective rear-wheel driving shafts 64.

Further, the swing arm 51 includes a support beam 51a extending in the lateral direction of the vehicle 1 and pivotably connected to the chassis 4. To the support beam 51a are connected three arms, i.e., left, central and right arms 51b, 51c and 51d extending rearward from the support beam 51a. Thus, the swing arm 51 is in the E shape as viewed in plan. The central arm 51c is in a tubular shape, and a housing 63a of the rear-wheel differential gear 63 is coupled with the rear end of the central arm 51c. The rear propeller shaft 61 connected with the rear-wheel differential gear 63 is threaded through the central arm 51c. The rear propeller shaft 61 is also connected with the support beam 51a of the swing arm 51 via the universal joint 62 so that it is vertically movable together with the swing arm 51.

The connecting members 52 extending away from each other in the lateral direction of the vehicle 1 are secured at their inner ends to the opposite sides of the housing 63a of the rear-wheel differential gear 63. The housing 63a and connecting members 52 together function as a beam to which are connected the rear ends of the three arms 51b to 51d. The rear-wheel driving shafts 64 are rotatably threaded through the respective tubular connecting members 52; however, these connecting members 52 are not movable in the axial direction thereof. That is, although the rear-wheel driving shafts 64 are rotatably supported by the swing arm 51 via the connecting members 52, the swing arm 51 is fixed against axial displacement. Accordingly, relative to the chassis 4, the rear wheels 6 are movable vertically but immovable laterally.

The rear-wheel differential gear 63, rear-wheel driving shafts 64 and connecting members 52 are provided concentrically. The left and right subbeams 53 have their proximal ends connected to the outward ends of the respective connecting members 52, from which the subbeams 53 extend forward.

Each of the left and right subbeams 53 is retractable expandable in the travelling direction of the vehicle 1 in order to permit adjustment of the tension of the associated crawler belt 9 (FIG. 1). Each of the left and right subbeams 53 has the beam member 54 vertically pivotably coupled with one of the connecting members 52. The beam extensions 55 are connected to front end portions of the respective beam members 54 for sliding movement in the front-rear direction along or parallel to the side surface thereof and support the respective intermediate- wheel axles 56. The intermediate wheels 7 (FIG. 2) are mounted on the respective intermediate-wheel axles 56. In this way, the intermediate wheels 7 are movable only in the vertical direction relative to the chassis 4.

Each of the beam extensions 55 is connected to the beam member 54 via the turnbuckle 57 for adjustable sliding movement relative to the beam member 54, so that the tension of the associated crawler belt 9 is adjusted by means of the turnbuckle 57. Reference numeral 54a represents guides for the beam extensions 55, and reference numeral 54b represents bolts, by each of which the beam extension 55 is adjustably attached to the beam member 54. The left and right subbeams 53 are interconnected by means of a pivotable cross rod 58 near the location where the intermediate-wheel axles 56 are connected thereto. Further, reference numeral 51e represents reinforcing members adding to the mechanical strength of the swing arm 51, and reference 59 represents a rear guard for protecting the rear end portion of the rear suspension 50.

FIG. 22 is an exploded perspective view showing how the cross rod 58 is attached to the left and right subbeams 53. The cross rod 58 has a pair of joint ring 58a at the axial ends thereof, and a rubber bush 85 functioning as a damper is compressedly inserted in each of the joint rings 58a. The cross rod is vertically pivotably connected, at the opposite ends, to brackets 54c of the beam members 54 by bolts 86 each threaded through the bracket 54c and rubber bush 85.

Figure 23:
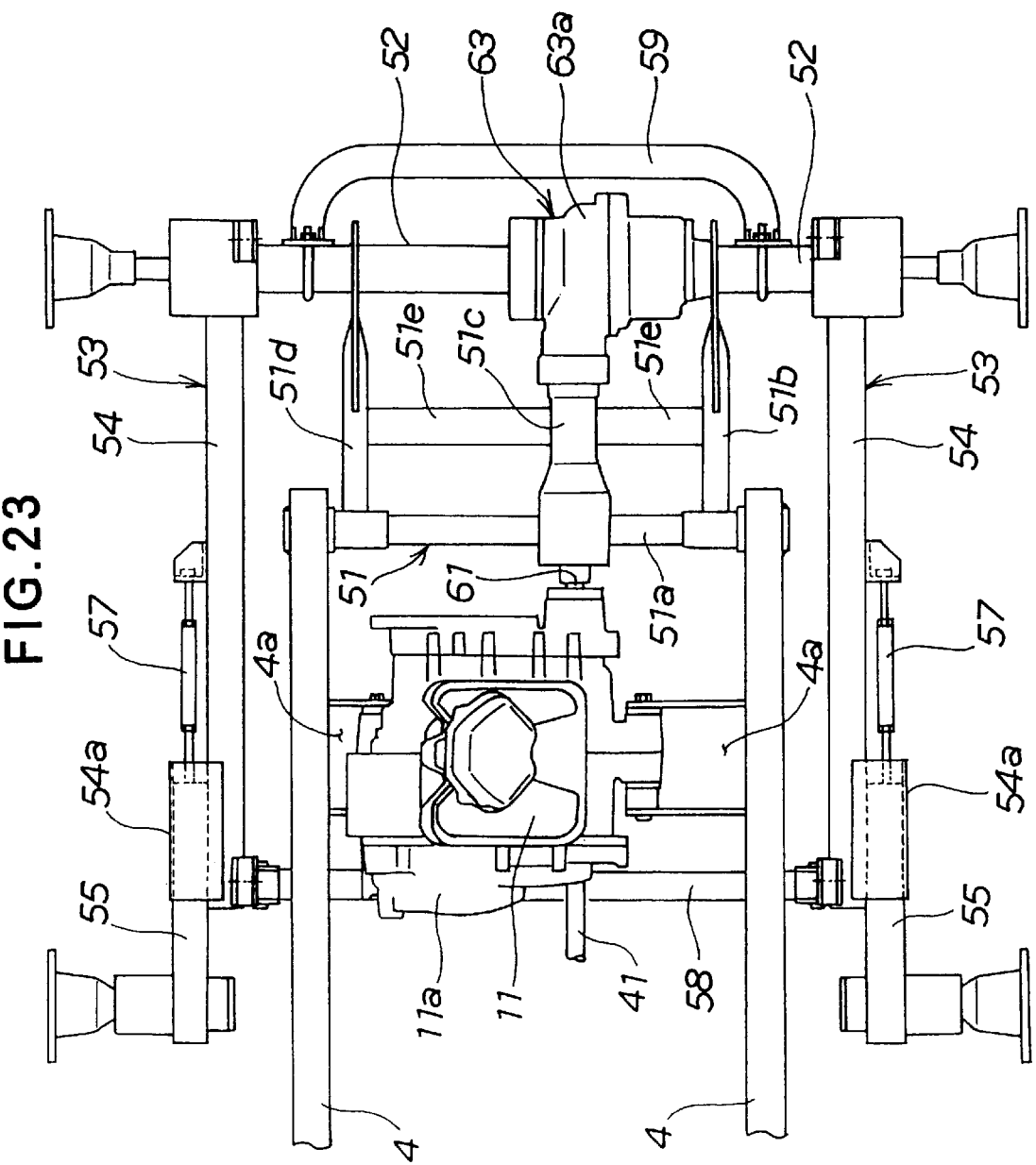
FIG. 23 is a plan view of the rear suspension.

FIG. 23 is a plan view of the rear suspension 50. As shown, the rear suspension 50 supports the engine 11 with the transmission 11a, via the brackets 4a, on the rear portion of the chassis 4 practically at a laterally central position of the vehicle 1.

Figure 24A:
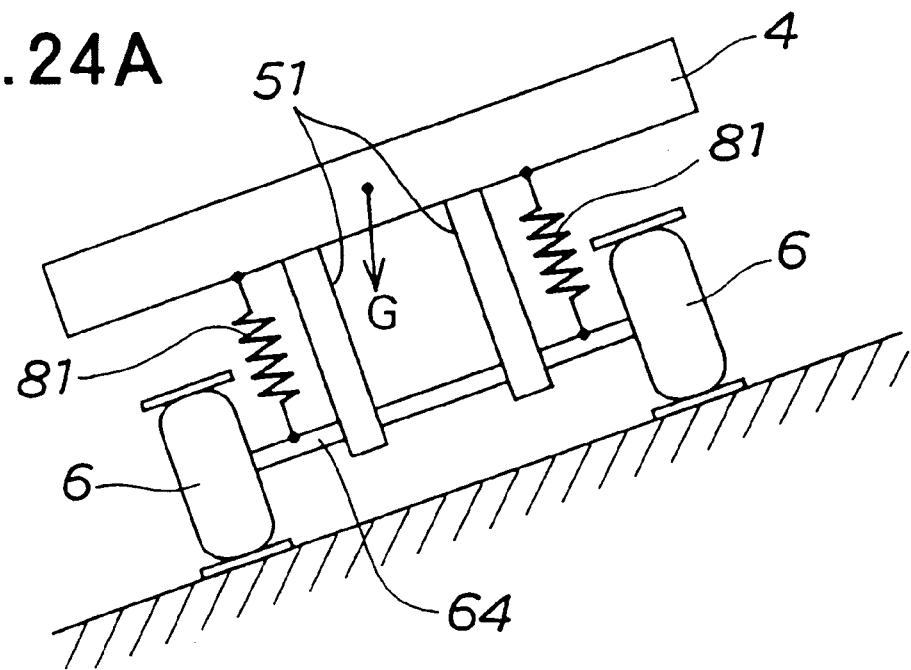
FIG. 24A is a view showing how the rear suspension of the present invention operates.
Figure 24B:
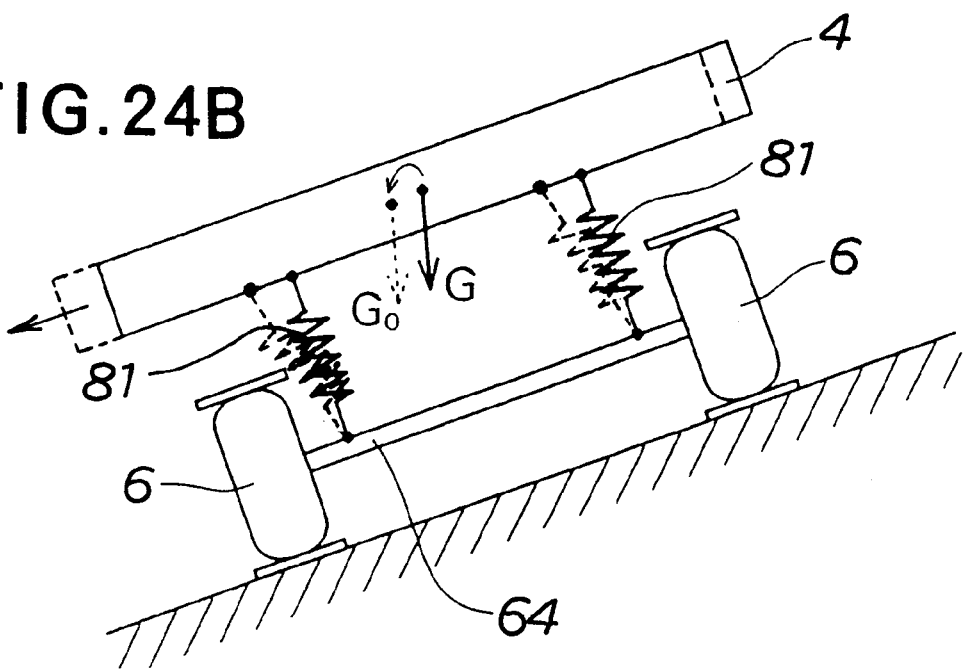
FIG. 24B is a view showing how a conventional rear suspension operates.
Figure 25:
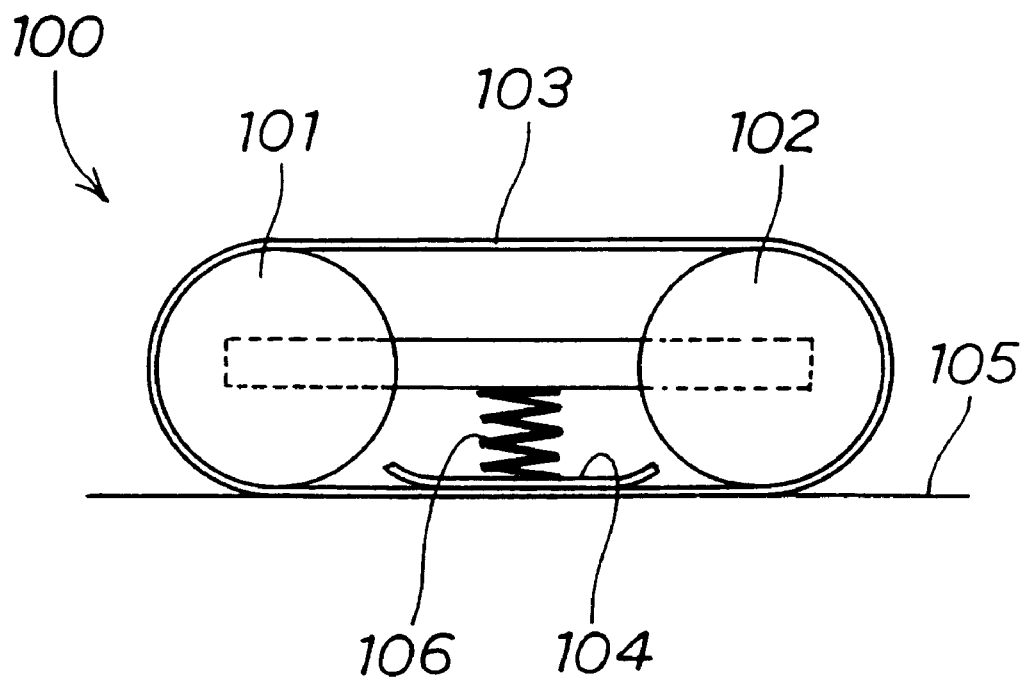
FIG. 25 is a view showing a crawler proposed as an approach to increase its ground adhesion force with a relatively simple construction.

The following paragraph describes exemplary operation of the rear suspension 50 with reference to FIGS. 24A and 24B, of which FIG. 24A shows how the rear suspension 50 of the present invention operates while FIG. 24B shows how a conventional rear suspension operates. Specifically, FIG. 24B shows a half-crawler vehicle where the chassis 4 and rear wheels 6 are interconnected via the oil dampers 81. When the chassis 4 tilts leftward as the half-crawler vehicle runs along a slope, the chassis 4 above the oil dampers 81 is displaced toward the bottom of the slope and hence the center of gravity G of the chassis 4 shifts to the slope bottom ($G \rightarrow G_0$). Thus, the weight balance of the chassis is lost, which would significantly influence the controllability of the vehicle 1.

In contrast, in the half-crawler vehicle of the present invention shown in FIG. 24A, the chassis 4 is connected with the rear wheels 6 via the swing arm 51 against lateral displacement relative to the rear wheels 6, so that the center of gravity G of the chassis 4 would not move relative to the rear wheels 6 in the lateral direction of the vehicle. Thus, the weight balance of the chassis is maintained and the controllability of the vehicle 1 is not influenced.

In the illustrated example of FIG. 2, the rear wheels 6 are mounted in such a manner that they are movable relative to the chassis 4 in the vertical direction but not in the lateral direction. Consequently, during sharp turning movement of the crawler belt vehicle 1, there is produced force causing the crawler belts 9 to slip sideways relative to the rear wheels 6. The half-crawler vehicle of the present invention can positively make use of the side slip of the crawler belts 9 to thereby enhance its sharp turning capability to a significant degree.

Further, because the two subbeams 53 are vertically pivotally connected via the connecting members 52 to the swing arm 51 and the intermediate wheels 7 (FIG. 2) are mounted on the axles 56 fixed to the front end portions of the forward extensions of the subbeams 53 as shown in FIG. 21, the two intermediate wheels 7 can vertically move independently of each other. This allows the intermediate wheels 7 to smoothly move up and down in accordance with ups and downs of a ground. Therefore, when the crawler bell vehicle 1 is running on a ground with numerous ups and downs, the chassis 4 is allowed to move up and down slowly due to the smooth, independent, vertical movement of the intermediate wheels 7. As a result, good ground followability and hence good riding conform are afforded. In addition, even where the rear wheels 6 are mounted in such a manner to vertically move together relative to the chassis 4, it is possible to constrain sudden vertical movements of the chassis 4.

Furthermore, when the crawler belts 9 are driven via the rear wheels 6, the reactive force produces some moment in the crawler which would lift the intermediate wheels. Thus, the crawler can easily get over a pile of snow or mud lying ahead of the crawler, so that the running performance of the crawler belt vehicle 1 can be significantly enhanced on the snow-covered or muddy ground.

In the above-described embodiment, the speed changing mechanism 45 and clutch mechanism 46 (FIG. 19) may be provided between the engine 11 and the front-wheel driving shafts 43 or between the engine 11 and the rear-wheel driving shafts 64. The number of the speed changing stages may be chosen depending on an intended application, and the mounting of the clutch mechanism 46 is also optional.

It is only necessary that the rear and intermediate wheels 6 and 7 be mounted in such a manner that they are movable relative to the chassis 4 in the vertical direction but not in the lateral direction. For example, the rear-wheel driving shafts 64 may be directly connected to the front end of the swing arm 51 in such a manner that they are movable only in the vertical direction and not movable in the lateral direction, and the rear wheels 6 may be mounted on these shafts 64. Each of the subbeams 53 only need be retractably expandable in the travelling direction of the vehicle 1 so as to adjust the tension of the crawler belt 9, and may be constructed in any other suitable manner without being limited to the above-described combination of the beam member 54, beam extension 55 and turnbuckle 57.

What is claimed is:

1. A crawler belt vehicle comprising: a chassis; a pair of first wheels mounted on the chassis; a pair of second wheels mounted on the chassis; a pair of crawler belts each trained around respective ones of the first pair of wheels and the second pair of wheels, each of the crawler belts having a plurality of low-friction members spaced-apart from each other in a longitudinal direction of the crawler belt; a pair of equalizers each for pressing one of the crawler belts against a ground, each of the equalizers having a leaf spring having a first end connected to the chassis and a second end opposite the first end, and a slider supported on the second end of the leaf spring for undergoing pivotal movement about an axis extending in the longitudinal direction of the crawler belt for pressing the crawler belt against the ground by the resiliency of the leaf spring; wherein each of the low-friction members of the crawler belt projects into sliding contact with the slider and has a lower coefficient of friction than that of the crawler belt; and wherein each of the sliders is positioned at a distance from the respective crawler belt via the low-friction members; a pair of front wheels mounted on a front portion of the chassis, each of the front wheels having a pneumatic tire having a ground pressure set within a range of 0.1–0.15 kgf/cm$^2$; wherein the first wheels are disposed on a first side of the chassis and comprise a first rear wheel having a pneumatic tire and mounted on a rear portion of the chassis and a first intermediate wheel mounted on the chassis between the front wheels and the first rear wheel; wherein the second wheels are disposed on a second side of the chassis opposite the first side thereof and comprise a second rear wheel having a pneumatic tire and mounted on the rear portion of the chassis and a second intermediate wheel mounted on the chassis between the front wheels and the second rear wheel; and wherein a ground pressure of the crawler belts is set within a range of 0.04–0.05 kgf/cm$^2$.

2. A crawler belt vehicle comprising: a chassis; a pair of first wheels mounted on the chassis; a pair of second wheels mounted on the chassis; a pair of crawler belts each trained around respective ones of the first pair of wheels and the second pair of wheels, each of the crawler belts having a plurality of low-friction members spaced-apart from each other in a longitudinal direction of the crawler belt; a pair of equalizers each for pressing one of the crawler belts against a ground, each of the equalizers having a leaf spring having a first end connected to the chassis and a second end opposite the first end, and a slider supported on the second end of the leaf spring for undergoing pivotal movement about an axis extending in the longitudinal direction of the crawler belt for pressing the crawler belt against the ground by the resiliency of the leaf spring; wherein each of the low-friction members of the crawler belt projects into sliding contact with the slider and has a lower coefficient of friction than that of the crawler belt; and wherein each of the sliders is positioned at a distance from the respective crawler belt via the low-friction members; a pair of front wheels mounted on a front portion of the chassis, each of the front wheels having a pneumatic tire; wherein the first wheels are disposed on a first side of the chassis and comprise a first rear wheel having a pneumatic tire and mounted on a rear portion of the chassis and a first intermediate wheel mounted on the chassis between the front wheels and the first rear wheel; wherein the second wheels are disposed on a second side of the chassis opposite the first side thereof and comprise a second rear wheel having a pneumatic tire and mounted on the rear portion of the chassis and a second intermediate wheel mounted on the chassis between the front wheels and the second rear wheel; wherein a driving force for the crawler belt vehicle is delivered from the pneumatic tires of the first and second rear wheels to the crawler belts by frictional resistance between the pneumatic tires and the crawler belts; and wherein each of the crawler belts has a plurality of discharge openings for letting out foreign substances, including snow or mud, drawn into an inner surface area of the crawler belts.

3. A crawler belt vehicle as recited in claim 2; wherein the discharge openings are formed along opposite longitudinal edge portions of each of the crawler belts.

4. A crawler belt vehicle as recited in claim 2; wherein each of the crawler belts comprises left, central and right belt members disposed in parallel relation to each other and connected together at locations spaced apart from each other in the longitudinal direction of the crawler belt so as to form the plurality of discharge openings along opposite longitudinal edge portions of the crawler belt.

5. A crawler belt vehicle comprising: a chassis; a pair of first wheels mounted on the chassis; a pair of second wheels mounted on the chassis; a pair of crawler belts each trained around respective ones of the first pair of wheels and the second pair of wheels, each of the crawler belts having a plurality of low-friction members spaced-apart from each other in a longitudinal direction of the crawler belt; and a pair of equalizers each for pressing one of the crawler belts against a ground, each of the equalizers having a leaf spring having a first end connected to the chassis and a second end opposite the first end, a slider supported on the second end of the leaf spring for undergoing pivotal movement about an axis extending in the longitudinal direction of the crawler belt for pressing the crawler belt against the ground by the resiliency of the leaf spring, a base pivotally connected to the second end of the leaf spring, at least one resilient member attached to an underside of the base, and a support attached to a lower end of the resilient member, the slider being removably attached to an underside of the support; wherein each of the low-friction members of the crawler belt projects into sliding contact with the slider and has a lower coefficient of friction than that of the crawler belt; and wherein each of the sliders is positioned at a distance from the respective crawler belt via the low-friction members.

6. A crawler belt vehicle comprising: a chassis; a pair of first wheels mounted on the chassis; a pair of second wheels mounted on the chassis; a pair of crawler belts each trained around respective ones of the first pair of wheels and the second pair of wheels, each of the crawler belts having a plurality of low-friction members spaced-apart from each other in a longitudinal direction of the crawler belt; a pair of equalizers each for pressing one of the crawler belts against a ground, each of the equalizers having a leaf spring having a first end connected to the chassis and a second end opposite the first end, and a slider supported on the second end of the leaf spring for undergoing pivotal movement about an axis extending in the longitudinal direction of the crawler belt for pressing the crawler belt against the around by the resiliency of the leaf spring; wherein each of the low-friction members of the crawler belt projects into sliding contact with the slider and has a lower coefficient of friction than that of the crawler belt; and wherein each of the sliders is positioned at a distance from the respective crawler belt via the low-friction members; a pair of front wheels rotatably supported on a front portion of the chassis; a swing arm having a front end and a rear end mounted on a rear end portion of the chassis for undergoing pivotal movement about a first axis relative to the chassis; a pair of rear-wheel driving shafts mounted for rotation about a second axis and connected to the rear end of the swing arm for undergoing pivotal movement therewith; a pair of beam members connected to the rear end of the swing arm for undergoing pivotal movement therewith; a pair of intermediate-wheel axles each mounted on one of the beam members for rotation about a third axis and for undergoing pivotal movement with the swing arm; wherein the first wheels comprise a first rear wheel mounted on one of the rear-wheel driving shafts for rotation therewith and a first intermediate wheel mounted on one of the intermediate-wheel axles for rotation therewith; wherein the second wheels comprise a second rear wheel mounted on the other of the rear-wheel driving shafts for rotation therewith and a second intermediate wheel mounted on the other of the intermediate-wheel axles for rotation therewith; and wherein when the swing arm undergoes pivotal movement about the first axis, the first and second rear wheels and the first and second intermediate wheels undergo pivotal movement with the swing arm relative to the chassis but do not undergo linear movement along the second axis and the third axis, respectively.

7. A crawler belt vehicle according to claim 6; wherein each of the beam members is mounted for adjustable extension and retraction in a moving direction of the crawler belt vehicle for adjusting a tension of the crawler belts.

8. A crawler belt vehicle according to claim 6; further comprising a pivotable cross rod for interconnecting the beam members proximate the intermediate-wheel axles.

9. A crawler belt vehicle as recited in any one of claims 1, 2, 5 and 6; wherein a portion of each of the low-friction members slidably contacting the slider has a circular shape.

10. A crawler belt vehicle as recited in claim 9; wherein the low-friction members are integral with the crawler belt.

11. A crawler belt vehicle as recited in claim 10; wherein each of the low-friction members is comprised of a material selected from the group consisting of low-friction resin, low-friction rubber, steel and aluminum; wherein the material of the low-friction members has a lower coefficient of friction resistance than the crawler belt; and wherein each of the sliders is made of low-friction resin having a lower coefficient of friction resistance than the crawler belt.

12. A crawler belt vehicle as recited in claim 10; wherein each of the low-friction members is made of low-friction rubber having a lower coefficient of friction resistance than the crawler belt; and wherein each of the sliders is made of one of steel and aluminum.

13. A crawler belt vehicle as recited in claim 9; wherein each of the low-friction members is comprised of a material selected from the group consisting of low-friction resin, low-friction rubber, steel and aluminum; wherein the material of the low-friction members has a lower coefficient of friction resistance than the crawler belt; and wherein each of the sliders is made of low-friction resin having a lower coefficient of friction resistance than the crawler belt.

14. A crawler belt vehicle as recited in claim 9; wherein each of the low-friction members is made of low-friction rubber having a lower coefficient of friction resistance than the crawler belt; and wherein each of the sliders is made of one of steel and aluminum.

15. A crawler belt vehicle as recited in any one of claims 1, 2, 5 and 6; wherein the low-friction members are integral with the crawler belt.

16. A crawler belt vehicle as recited in claim 15; wherein each of the low-friction members is comprised of a material selected from the group consisting of low-friction resin, low-friction rubber, steel and aluminum; wherein the material of the low-friction members has a lower coefficient of friction resistance than the crawler belt; and wherein each of the sliders is made of low-friction resin having a lower coefficient of friction resistance than the crawler belt.

17. A crawler belt vehicle as recited in claim 15; wherein each of the low-friction members is made of low-friction rubber having a lower coefficient of friction resistance than the crawler belt; and wherein each of the sliders is made of one of steel and aluminum.

18. A crawler belt vehicle as recited in any one of claims 1, 2, 5 and 6; wherein each of the low-friction members is comprised of a material selected from the group consisting of low-friction resin, low-friction rubber, steel and aluminum; wherein the material of the low-friction members has a lower coefficient of friction resistance than the crawler belt; and wherein each of the sliders is made of low-friction resin having a lower coefficient of friction resistance than the crawler belt.

19. A crawler belt vehicle as recited in any one of claims 1, 2, 5 and 6; wherein each of the low-friction members is made of low-friction rubber having a lower coefficient of friction resistance than the crawler belt; and wherein each of the sliders is made of one of steel and aluminum.

* * * * *